(12) United States Patent
Hochberg et al.

(10) Patent No.: US 7,339,724 B2
(45) Date of Patent: Mar. 4, 2008

(54) BREMSSTRAHLUNG LASER ("BLASER")

(75) Inventors: Michael J. Hochberg, Pasadena, CA (US); Tom Baehr-Jones, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/477,237

(22) Filed: Jun. 28, 2006

(65) Prior Publication Data
US 2008/0007817 A1      Jan. 10, 2008

Related U.S. Application Data

(60) Provisional application No. 60/694,569, filed on Jun. 28, 2005.

(51) Int. Cl.
*H01S 3/00*    (2006.01)
(52) U.S. Cl. .......................................... 359/335; 372/2
(58) Field of Classification Search ................ 372/2; 359/335
See application file for complete search history.

(56) References Cited

U.S. PATENT DOCUMENTS 4,755,764 A * 7/1988 Rosenberg et al. ......... 359/335
6,219,175 B1 * 4/2001 Yamada ..................... 359/335
6,301,041 B1 * 10/2001 Yamada ..................... 359/333

OTHER PUBLICATIONS

Gover et al, Investigation of the Gain Regimes and Gain Parameters of the Free Electron Laser Dispersion Equation, Jul. 1985, IEEE Journal of Quantum Optics, vol. Qe-21, No. 7.*

* cited by examiner

*Primary Examiner*—Mark Hellner
(74) *Attorney, Agent, or Firm*—Joseph B. Milstein; Hiscock & Barclay, LLP

(57) ABSTRACT

A light generating system that comprises a narrow evacuated slot defined between at least two high index contrast waveguide elements. The apparatus can be fabricated using a material such as a SOI wafer having an oxide layer thickness of the order of 1 micron and a top silicon layer thickness of the order of 100-150 nm. Electrode contacts are provided to at least two waveguide elements fabricated in the top silicon layer, each waveguide element having a thickness comparable to the top silicon layer thickness, a width of some hundreds of nm, and having a slot having dimensions in the range of 50-200 nm defined therebetween. The length of the slot is at least as long as the slot width. Charged particles, such as electrons, that are emitted and accelerated across the slot by an applied electrical signal provide a source of photons as a consequence of being accelerated and/or decelerated.

21 Claims, 16 Drawing Sheets

BREMSSTRAHLUNG LASER ("BLASER")

CROSS-REFERENCE TO RELATED APPLICATIONS

This application claims priority to and the benefit of now abandoned U.S. provisional patent application Ser. No. 60/694,569, filed Jun. 28, 2005 which application is incorporated herein by reference in its entirety.

STATEMENT REGARDING FEDERALLY FUNDED RESEARCH OR DEVELOPMENT

The invention described herein was made in the performance of work under Air Force Office of Scientific Research Grant F49620-03-1-0418, and is subject to the provisions of Public Law 96-517 (35 U.S.C. §202) in which the Contractor has elected to retain title.

FIELD OF THE INVENTION

The invention relates to lasers in general and particularly to a laser that employs charged particles undergoing acceleration as a source of electromagnetic radiation.

BACKGROUND OF THE INVENTION

Electron lasers have been described in the literature for some time. In particular, John M. J. Madey (B.S. Physics Caltech 1964, M.S. Electrical Engineering Caltech 1965) is the inventor of the free electron laser, first described in U.S. Pat. No. 3,822,410, issued Jul. 2, 1974, the entire disclosure of which is incorporated herein by reference. As will be immediately recognized upon reviewing the literature on free electron lasers, the apparatus needed to generate such laser radiation is complex, large, and expensive. Many other patents relating to free electron lasers, and relating to many other types of lasers, including gas lasers and solid state lasers, have issued. There is also an extensive technical literature on the subject.

The concept of radiation generated under acceleration (or deceleration) of charged particles is well known and has been discussed in the literature for many years. The term "Bremsstrahlung" means "braking (or deceleration) radiation" in German, although it is now sometimes used more generally.

There is a need for simple, small and inexpensive systems that permit the generation of radiation, including coherent radiation.

SUMMARY OF THE INVENTION

In one aspect, the invention relates to an apparatus for generating Bremsstrahlung radiation. The apparatus comprises a substrate having an insulating surface; a high index contrast waveguide having at least two waveguide elements adjacent the insulating surface, the at least two waveguide elements having a region defined therebetween, the at least two waveguide elements each having at least one electrical contact in electrical communication therewith; and a source of electrical potential in communication with each of the contacts, the source of electrical potential configured to apply an electrical potential difference between the at least two waveguide elements. When activated; the apparatus emits Bremsstrahlung radiation from the region between the at least two waveguide elements in response to an application of electrical potential between the at least two waveguide elements.

In one embodiment, the region between the at least two waveguide elements comprises a region devoid of matter to provide a vacuum condition therein. In one embodiment, the region between the at least two waveguide elements is filled with an insulating material. In one embodiment, the insulating material is a nanostructured material. The nanostructured material, such as a quantum dot composite in polymer matrix, can be designed to enhance the tunneling probability of the electrons moving between the two sides of the waveguides. In one embodiment, the Bremsstrahlung radiation is light. In one embodiment, the light is coupled to an optical mode of the at least two waveguide elements. In one embodiment, the apparatus for generating Bremsstrahlung radiation further comprises an optical source. In one embodiment, the apparatus for generating Bremsstrahlung radiation further comprises an optical amplifier. In one embodiment, the apparatus for generating Bremsstrahlung radiation further comprises optical feedback. In one embodiment, the apparatus is configured to emit laser radiation. In one embodiment, the apparatus is coupled to means for providing an optical nonlinearity.

In another aspect, the invention relates to a method of generating Bremsstrahlung radiation. The method comprises the steps of providing an apparatus comprising a substrate having an insulating surface; and a high index contrast waveguide having at least two waveguide elements adjacent the insulating surface, the at least two waveguide elements having a region defined therebetween, the at least two waveguide elements each having at least one electrical contact for receiving an electrical signal in electrical communication therewith; and applying an electrical potential difference between the at least two waveguide elements via the respective electrical contacts. The apparatus is caused to emit Bremsstrahlung radiation from the region between the at least two waveguide elements in response to the application of electrical potential between the at least two waveguide elements.

In one embodiment, the region between the at least two waveguide elements comprises a region devoid of matter to provide a vacuum condition therein. In one embodiment, the region between the at least two waveguide elements is filled with an insulating material. In one embodiment, the insulating material is a nanostructured material. The nanostructured material, such as a quantum dot composite in polymer matrix, can be designed to enhance the tunneling probability of the electrons moving between the two sides of the waveguides. In one embodiment, the Bremsstrahlung radiation is light. In one embodiment, the light is coupled to an optical mode of the at least two waveguide elements. In one embodiment, the provided apparatus further comprises an optical source. In one embodiment, the provided apparatus further comprises an optical amplifier. In one embodiment, the provided apparatus further comprises optical feedback. In one embodiment, the Bremsstrahlung radiation is laser radiation. In one embodiment, the radiation is X-ray or UV radiation. In one embodiment, the radiation is infrared or terahertz radiation.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 17A is a diagram that shows a dispersion diagram of both a segmented waveguide and the normal, unsegmented waveguide, taken on a plane parallel to the substrate that on a z plane that intersects the middle of a segment.

FIG. 17B is a diagram that shows modal patterns of the Bloch mode, with contours of |E| plotted, starting at 10% of the max value and with contour increments of 10%.

FIG. 17C is a diagram that shows a plot of modal patterns over four periods of a segmented waveguide on a horizontal plane that intersects the silicon layer halfway through.

Figure 25:
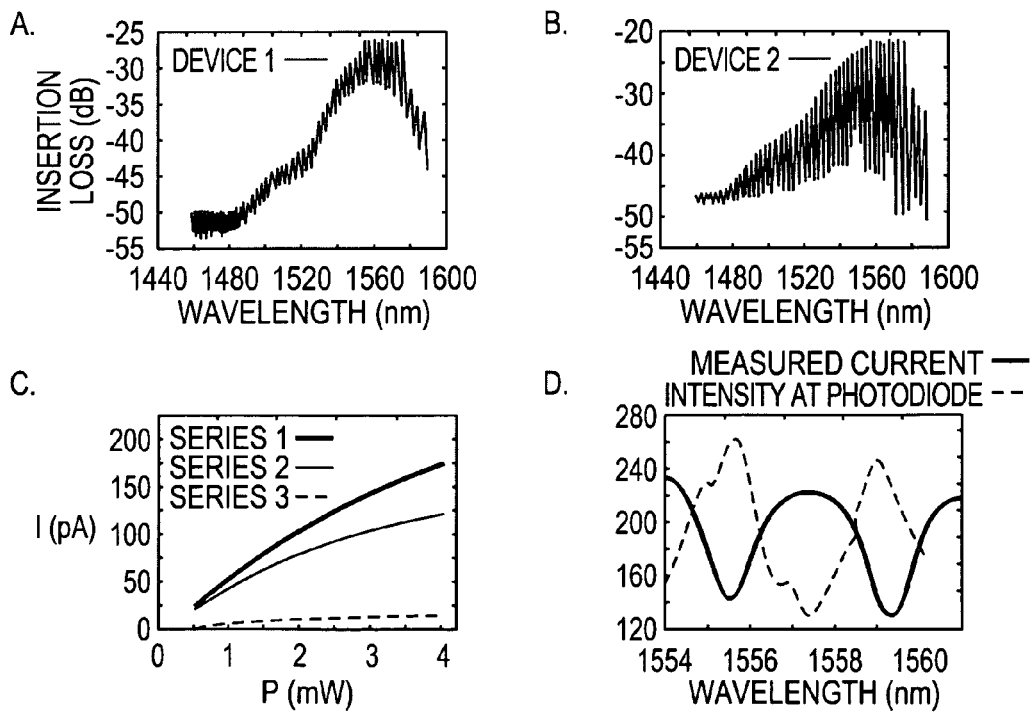

Panel A of FIG. 25 shows the transmission spectrum of detector device 1, according to principles of the invention.

Panel B of FIG. 25 shows the transmission spectrum of detector device 2, according to principles of the invention.

Panel C of FIG. 25 shows several curves of current vs. power for three measurement series.

Panel D of FIG. 25 shows the output current as a function of wavelength, overlaid with the transmission spectrum.

Figure 26:
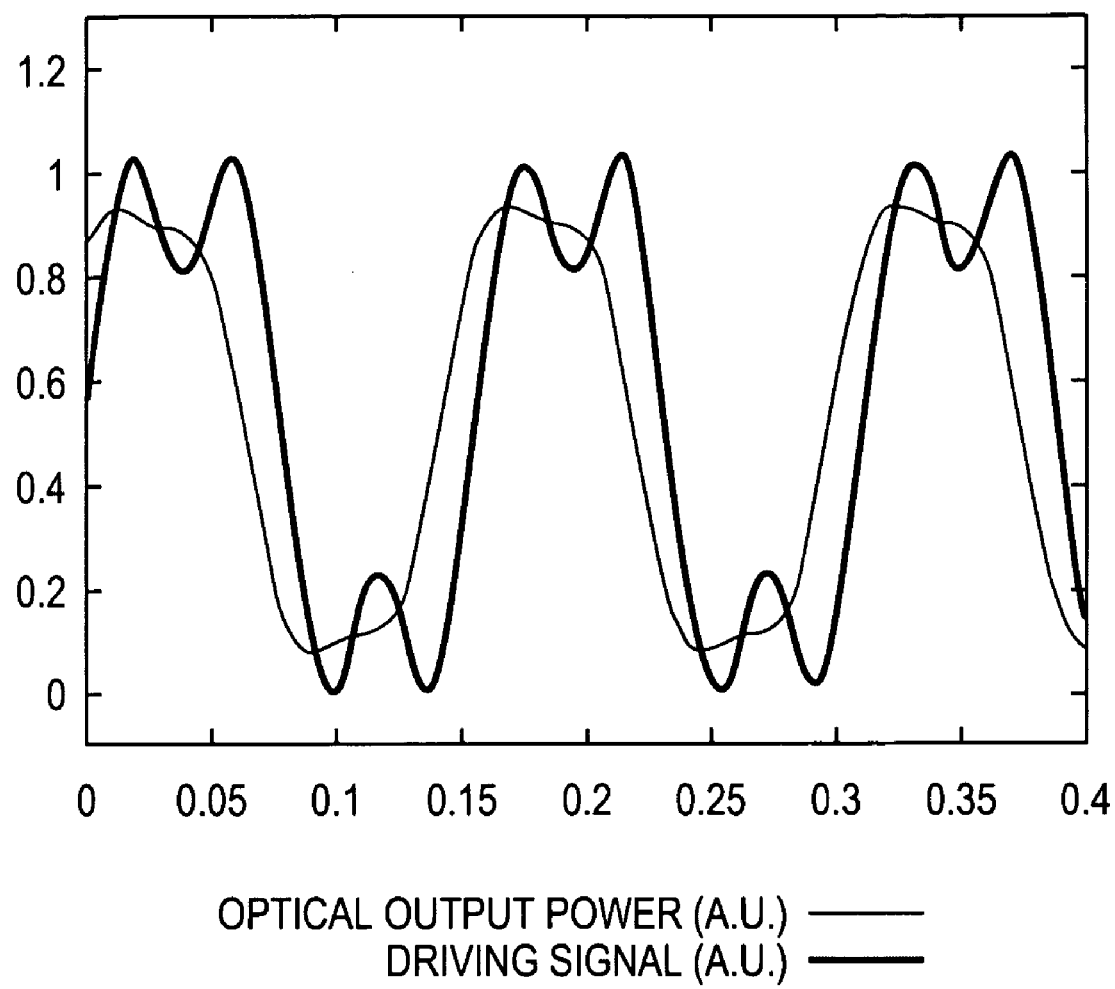

FIG. 26 is a diagram showing the use of the structures embodying the invention as resonantly enhanced electro-optic modulators, and a result at approximately 6 MHz operating frequency.

Figure 27:
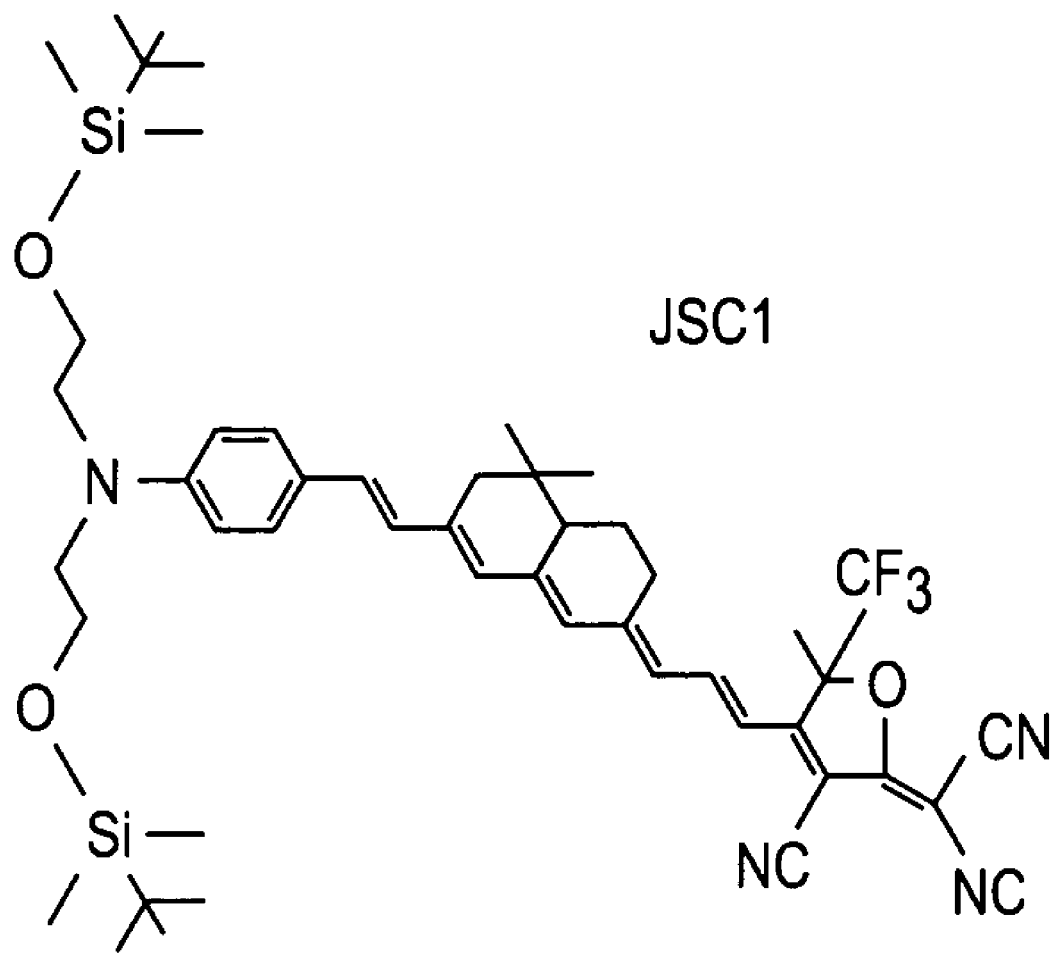

FIG. 27 is a diagram showing a chemical formula for the chromophore referred to as JSC1.

DETAILED DESCRIPTION OF THE INVENTION

We have developed a set of tools for concentrating light to a high degree by using silicon or other high index contrast waveguides. In particular, by utilizing split waveguides, as described herein in greater detail, we are able to greatly enhance the optical fields in the cladding of a tightly confined waveguide, without greatly enhancing the optical losses of the same waveguide. These waveguides can be made to conduct electricity through doping. Although initial results have been obtained in silicon, there is no reason that other high index contrast materials, such as diamond, gallium arsenide, indium phosphide, gallium phosphide, gallium arsenide, sapphire, etc. could not be used. It is possible to independently bias the arms of a split waveguide, such that very large electric fields are formed in the gap between the arms.

By biasing the two arms to different voltages, it is possible to accelerate electrons across the gap at extremely high rates, resulting in Bremsstrahlung radiation. This radiation, in combination with the high optical field associated with the optical mode of such a structure, could result in the ability to produce a fundamentally new light source. The wavelengths available may be anywhere from the X-ray to the microwave.

The laser works by accelerating charges across a gap in a slot waveguide in vacuum. The slot is about 110 microns high, by 140 nm wide by any convenient length, which can be an unrestricted length limited only by fabrication capability. In general, the slot length is at least as long as the slot width. The electrons give off radiation classically because accelerated charges radiate light.

For a 20 Volt voltage difference across the gap, the electrons are expected to accelerate to approximately 2 percent of the speed of light from zero velocity. The electrons may preferentially emit photons instead of gaining momentum. The energy that will be gained by crossing the gap represents about 20 photons worth of energy. The system may provide an efficient, broad band, or tunable, laser.

In terms of a classical analysis, it is expected that the electrons will emit some light through the fact that they are being accelerated. In an embodiment with a 140 nm wide void and ~20 volts of voltage drop, it is expected that the electrons will emit about $10^{-7}$ of the total energy they gain (20 eV) due to this effect. It is expected that the radiation is peaked right around 1550 nm. However, it is believed that due to the concentrated optical mode in the waveguides, and the extremely high DC field, there will be two additional effects. First, it is expected that there will be stimulated emission, which will cause the electrons to give off a photon due to the presence of additional radiation. Second, there may be reasons why the electrons cannot be accelerated as quickly as they would be classically, because the DC bias can't "resolve" itself without creating a photon, and can't transfer momentum quickly enough. In the classical analysis, the entire travel time for the electron across the gap is only $10^{-14}$ seconds.

Figure 1:
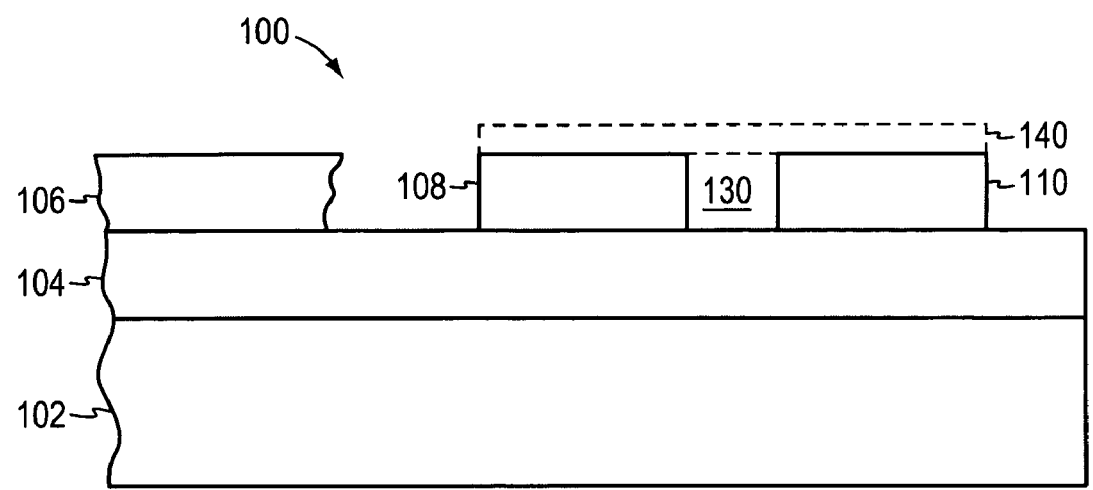
FIG. 1 is a cross section diagram showing an exemplary Bremsstrahlung laser, according to principles of the invention.

It is believed that slot waveguide structures in a vacuum that are subjected to electrical bias will generate light. FIG. 1 is a cross section diagram 100 showing an exemplary Bremsstralung laser. The Bremsstralung laser is fabricated on a silicon wafer, such as a commercial silicon-on-insulator ("SOI") wafer. The base silicon 102 serves as a substrate, or a handle to manipulate the device during fabrication, and as a handle for disposing the device in a geometric relation with other objects that one wants to use in a cooperative manner with a completed device. The SOI wafer can be a conventional (111) silicon wafer upon which a layer of silicon oxide 104 (comprising both silicon and oxygen and having a composition in the range of SiO to $SiO_2$) is grown or deposited with a thickness of approximately 1.4 microns (μm) and having a silicon layer 106 of approximately 110-120 nm grown on top of the silicon oxide layer. Using lithographic and etching techniques described herein, at least two high index contrast waveguide elements 108, 110 are fabricated in the top silicon layer 106. In the embodiment shown in cross section in FIG. 1, the at least two high index contrast waveguide elements 108, 110 have a height of approximately 110-120 nm corresponding to the thickness of the top silicon layer 106, a width of a convenient size such as 300 nm each, and a region 130 that is defined as a gap between the at least two high index contrast waveguide elements 108, 110 of approximately 140 nm. The region 130 may be referred to as a "slot" in the waveguide. Regions 130 can be wider or narrower than 140 nm depending on the voltage difference that one intends to use, and on other parameters such as radiation that one intends to generate. The at least two high index contrast waveguide elements 108, 110 can be doped to levels that provide suitable electrical conductivity in the silicon. The doping can be performed before or after the at least two high index contrast waveguide elements 108, 110 are fabricated from the top silicon layer 106. The at least two high index contrast waveguide elements 108, 110 can have any convenient shape as seen from the direction parallel to the plane of the paper of FIG. 1. For example, the at least two high index contrast waveguide elements 108, 110 can be linear, although one in principle can make the at least two high index contrast waveguide elements 108, 110 circular, oval, or serpentine.

The at least two high index contrast waveguide elements 108, 110 are conveniently provided with electrical contacts 140, 142 in electrical communication with the at least two high index contrast waveguide elements 108, 110, so that electrical signals can be applied to each of the at least two high index contrast waveguide elements 108, 110 individually. A desired voltage (or electrical potential) difference can thereby be applied between the at least two high index contrast waveguide elements 108, 110. The electrical contacts can be similar to the "fingers" shown in FIG. 16, or they can be as simple as heavily doped local regions of silicon, or regions upon which an electrically conductive substance, such as a metal, is deposited on some or all of the at least two high index contrast waveguide elements 108, 110. A source of electrical potential, not shown, is used to provide controlled electrical potential, and electrical power, to the devices of the invention. The source of electrical potential can be any convenient source, such as a conventional power supply or a battery, with or without the capability of being controlled by a computer or controller. The control of the electrical potential and power includes control of both the amplitude and the timing of signals.

The region 130 is maintained under vacuum while the devices of the invention are operated. In one embodiment, there can be provided an enclosure around the whole device 100 which is maintained at suitable vacuum level as and when required for operation. In another embodiment, a cover 140, shown in dotted line in FIG. 1, is provided to close region 130 from the upper side. The cover 140 can be a deposited layer of an electrical insulator, or can be a segment of a substantially planar layer, such as glass, aluminum oxide (sapphire), or another insulating substance, which planar layer is bonded, cemented, or otherwise held in place. In one embodiment, a peripheral edge comprising a raised closed loop of silicon material is provided as an edge boundary to which the glass or other cover can be cemented, followed by the pulling of vacuum thorough a tube which is then sealed off, as has been commonly done in the vacuum tube and the light bulb industries for many years.

We now turn to a discussion of how one can make devices such as have been described hereinabove, paying attention more to the general discussion of device fabrication and operation than to the detailed description of specific devices. The examples given herein are representative of what can be made using the fabrication methods we discuss hereinafter.

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices operating at much lower optical input power levels than are possible with conventional free space or chip based systems. We have demonstrated four-wave fluxing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Chi2 ($\chi^2$) and Chi3 ($\chi^3$) based optical effects can be used in particular to build on-chip optical parametric oscillator ("OPO") systems, where two input wavelengths can be mixed together to produce sum and difference frequencies. These frequencies can be either higher or lower than the input frequencies, and can be made tunable. These effects work for frequencies from the ultraviolet and X-ray regime all the way out into the far infrared and microwave, and in fact can work down to DC in some cases, particularly with optical rectification.

The material of which the high index waveguide is made can be any material having a high index that is reasonably transparent at the wavelengths of interest. This can include but is not limited to silicon, gallium nitride, indium phosphide, indium gallium nitride, gallium phosphide, diamond, sapphire, or the various quaternary III/V and II/VI materials such as aluminum gallium arsenide phosphide. III/V denotes materials having at least one element from column III of the periodic table of elements (or an element that is stable as a positive trivalent ion) and at least one element from column V (or an element that is stable as a negative trivalent ion). Examples of III/V compounds include BN, AlP, GaAs and InP. II/VI denotes materials having at least one element from column II of the periodic table of elements (or an element that is stable as a positive divalent ion) and at least one element from column VI (or an element that is stable as a negative divalent ion). Examples of II/VI compounds include MgO, CdS, ZnSe and HgTe.

We will now present a more detailed description of the systems and methods of the invention, including successively the mechanical structure of exemplary embodiments of high index waveguides, exemplary embodiments of cladding materials having large nonlinear constants $\chi^2$ and $\chi^3$ and their incorporation into devices having high index waveguides, exemplary results observed on some of the fabricated devices that are described, and some theoretical discussions about the devices and the underlying physics, as that theory is presently understood. Although the theoretical descriptions given herein are believed to be correct, the operation of the devices described and claimed herein does not depend upon the accuracy or validity of the theoretical description. That is, later theoretical developments that may explain the observed results on a basis different from the theory presented herein will not detract from the inventions described herein.

Exemplary High Index Waveguide Structures

EXAMPLE 1

High-Q Ring Resonators in Thin Silicon-on-Insulator

Resonators comprising high-Q microrings were fabricated from thin silicon-on-insulator (SOI) layers. Measured Q values of 45 000 were observed in these rings, which were then improved to 57 000 by adding a PMMA cladding. Various waveguide designs were calculated, and the waveguide losses were analyzed.

Microring resonator structures as laser sources and as optical filter elements for dense wavelength division multiplexing systems have been studied in the past. The silicon-on-insulator (SOI) structure described here is particularly advantageous. It has low waveguide loss. One can extrapolate an uncoupled Q value of 94 000 and a waveguide loss of 7.1 dB/cm in the unclad case, and −6.6 dB/cm in the PMMA clad case, from the respective measured Q values of 45 000 and 57 000. Although higher Q values have been obtained for optical microcavities, we believe that our geometry has the highest Q for a resonator based on a single mode silicon waveguide. It is also noteworthy that a large amount of power appears outside the core silicon waveguide, which may be important in some applications. The modes that are described herein have approximately 57% of the power outside the waveguide, as compared to 20% for a single-mode 200-nm-thick silicon waveguide, and 10% for a single-mode 300-nm-thick silicon waveguide.

Figure 2:
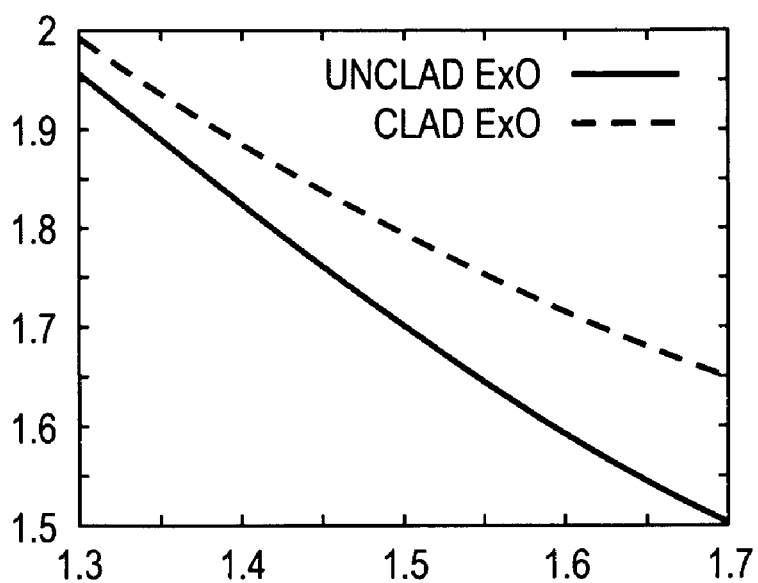
FIG. 2 is a diagram showing dispersion plots for the fundamental mode (Ex polarized) of exemplary clad and unclad waveguides, shown as effective index vs. wavelength in μm.

In the embodiment now under discussion, wafer geometries were selected that minimize the thickness of the SOI waveguiding layer as well as the buried oxide, but still yield low loss waveguides and bends. A number of different waveguide widths were compared by finite difference based mode solving. The geometry used in the exemplary embodiment comprises a 500-nm-wide waveguide formed in a 120-nm-thick silicon layer, atop a 1.4 µm oxide layer, which rests on a silicon handle, such as a silicon wafer as a substrate. Such a configuration supports only a single well-contained optical mode for near infrared wavelengths. The dispersion characteristics are shown in FIG. 2 for both unclad and PMMA-clad waveguides. Our interest in unclad structures stems from the ease of fabrication, as detailed in the following, as well as the flexibility an open air waveguide may provide for certain applications.

These modes were determined by using a finite difference based Hermitian eigensolver, described further herein. It is possible to calculate the loss directly from the mode pattern with an analytic method valid in the low-loss limit. The waveguide loss at 1.55 µm calculated in such a fashion is approximately −4.5 dB. This loss figure was in agreement with the extrapolated results of FDTD simulation.

Because a loss of −4 dB/cm is attributed to substrate leakage, the waveguide loss can be improved by the addition of a cladding, which tends to pull the mode upwards. This notion is supported by the measured decrease in waveguide loss upon the addition of a PMMA cladding. It can be shown that the substrate leakage loss attenuation coefficient is nearly proportional to $$e^{-2\sqrt{n_{eff}^2 - n_o^2 k_0 A}}$$

if $k_0$ is the free space wave number, $n_{eff}$ is the effective index of the mode, $n_o$ is the effective index of the oxide layer, and A is the thickness of the oxide. In the present case, the e-folding depth of the above-mentioned function turns out to be 180 nm, which explains why the substrate leakage is so high.

SOI material with a top silicon layer of approximately 120 nm and 1.4 µm bottom oxide was obtained in the form of 200 mm wafers, which were manually cleaved, and dehydrated for 5 min at 180° C. The wafers were then cleaned with a spin/rinse process in acetone and isopropanol, and air dried. HSQ electron beam resist from Dow Corning Corporation was spin coated at 1000 rpm and baked for 4 min at 180° C. The coated samples were exposed with a Leica EBPG-5000+ electron beam writer at 100 kV. The devices were exposed at a dose of 4000 µc/cm$^2$, and the samples were developed in MIF-300 TMAH developer and rinsed with water and isopropanol. The patterned SOI devices were subsequently etched by using an Oxford Plasmalab 100 ICP-RIE within 12 mTorr of chlorine, with 800 W of ICP power and 50 W of forward power applied for 33 s.

Figure 3:
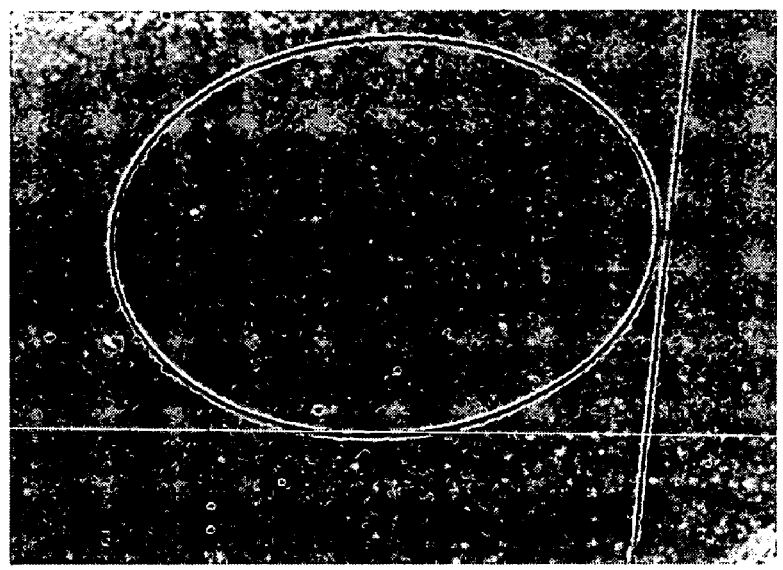
FIG. 3 is a diagram showing an SEM image of an exemplary ring resonator.

Microfabricated devices such as the one shown in FIG. 3 were tested by mounting the dies onto an optical stage system with a single-mode optical fiber array. A tunable laser was used first to align each device, and then swept in order to determine the frequency domain behavior of each of the devices. Light was coupled into the waveguides from a fiber mode by the use of grating couplers. Subsequently the devices were spin-coated with 11% 950 K PMMA in Anisole, at 2000 rpm, baked for 20 min at 180° C., and retested.

The theoretical development of the expected behavior of a ring resonator system has been described in the technical literature. In the present case the dispersion of the waveguide compels the addition of a dispersive term to the peak width. We take $\lambda_0$ to be the free space wavelength of a resonance frequency of the system, $n_0$ to be the index of refraction at this wavelength, $(\delta n/\delta \lambda)_0$, the derivative of n with respect to $\lambda$ taken at $\lambda_0$, L to be the optical path length around the ring, a to be the optical amplitude attenuation factor due to loss in a single trip around the ring, and finally t to be the optical amplitude attenuation factor due to traveling past the coupling region. In the limit of a high Q, and thus $$(1-\alpha) \ll 1 \text{ and } (1-t) \ll 1,$$

we have $$Q = \frac{\pi L}{\lambda_0} \frac{\left(n_0 - \lambda_0 \left(\frac{\partial n}{\partial \lambda}\right)_0\right)}{(1-\alpha t)}. \quad (1)$$

Figure 4:
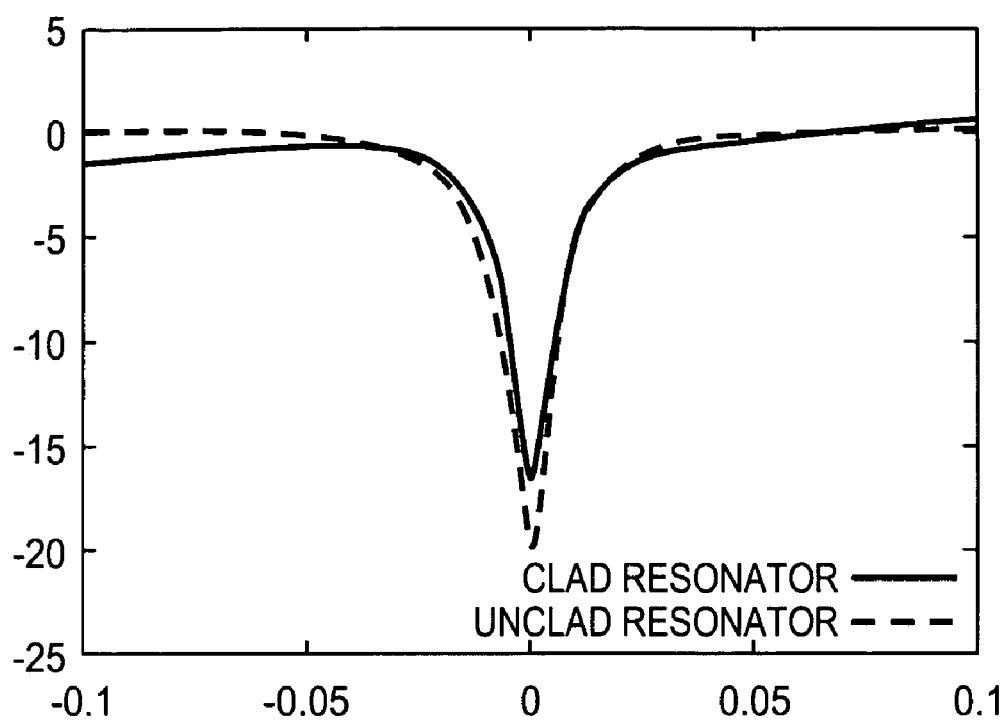
FIG. 4 is a diagram showing the normalized transmission of light through the system (and past the ring) in dB, as a function of wavelength detuning in nm for both clad and unclad waveguides, shifted to overlay resonance peaks.

The waveguide mode was coupled into a ring resonator from an adjacent waveguide. As shown in FIG. 3, the adjacent waveguide can in some embodiments be a linear waveguide. The strength of coupling can then be lithographically controlled by adjusting the distance between the waveguide and the ring. This ring was fabricated with a radius of 30 µm, a waveguide width of 500 nm, and a separation between ring and waveguide of 330 nm. For the clad ring presented, the measured Q is 45 000, and the extinction ratio is −22 dB, for the resonance peak at 1512.56 nm. The PMMA clad ring had a similar geometry, and achieved a Q of 57 000, but with an extinction ratio of −15.5 dB. Typical observed transmission spectra are shown in FIG. 4. The typical amount of optical power in the waveguide directly coupling into the resonator was about 0.03 mW. A dependence of the spectrum on this power was not observed, to within an order of magnitude.

From the mode-solving results for the unclad waveguides, we have $(\delta n/\delta \lambda)(1.512) = -1.182$ µm$^{-1}$, and $(\lambda=1.512)=1.688$. Using this result and the earlier relations, the waveguide loss can be calculated from the measured Q value. Specifically, an extinction that is at least −22 dB indicates that a critically coupled Q in this geometry is greater than 38 500, which then implies a waveguide loss of less than −7.1 dB/cm. In similar fashion, the PMMA clad waveguide resonator with a Q of 57 000 but only −15.5 dB of extinction allows a worst case waveguide loss of −6.6 dB/cm. This also implies an instrinsic Q of 77 000 for the unclad resonator, and an intrinsic Q of 94 000 for the PMMA clad resonator.

These devices have a slight temperature dependence. Specifically, the resonance peak shifts correspondingly with the change in the refractive index of silicon with temperature, moving over 2 nm as temperature shifts from 18 to 65° C. The Q rises with higher temperatures slightly, from 33 k at 18° C. to 37 k on one device studied. This shift can probably be explained entirely by the dependence of Q on the effective index.

EXAMPLE 2

High-Q Optical Resonators in Silicon-On-Insulator Based Slot Waveguides

We now describe the design, fabrication and characterization of high Q oval resonators based on slot waveguide geometries in thin silicon on insulator material. Optical quality factors of up to 27,000 were measured in such filters, and we estimate losses of −10 dB/cm in the slotted waveguides on the basis of our resonator measurements. Such waveguides enable the concentration of light to very high optical fields within nano-scale dimensions, and show promise for the confinement of light in low-index material with potential applications for optical modulation, nonlinear optics and optical sensing. As will be appreciated, the precise geometry of a resonator (or other kinds of devices) is frequently a matter of design, and the geometry can be varied based on such considerations as length of waveguide, area of a chip, and required interaction (or required non-interaction), such as coupling (or avoiding coupling) with other waveguide structures that are present in a device or on a chip. In some embodiments, the waveguide can be a closed loop, such as at least one ring or at least one oval shaped endless stripe. As has been explained, optical energy can be provided to such a closed loop, for example with an input waveguide.

One can form high quality factor ring or oval resonators in SOI. In these SOI waveguides, vertical confinement of light is obtained from the index contrast between the silicon core and the low index cladding and the buried silicon dioxide layer, whereas lateral confinement can be obtained by lithographically patterning the silicon. The majority of the light tends to be guided within the silicon core in such waveguide. Although the high refractive index contrast between silicon and its oxide provide excellent optical confinement, guiding within the silicon core can be problematic for some applications. In particular, at very high optical intensities, two-photon absorption in the silicon may lead to high optical losses. Moreover, it is often desirable to maximize the field intensity overlap between the optical waveguide mode and a lower index cladding material when that cladding is optically active and provides electro-optic modulation or chemical sensing.

Figure 5:
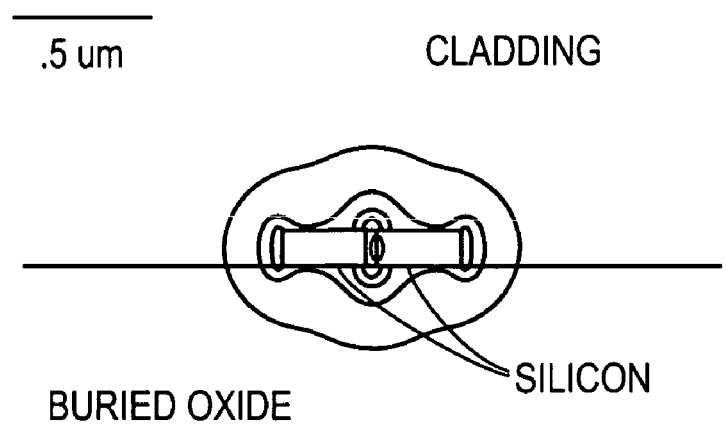
FIG. 5 is a diagram showing an exemplary slot waveguide mode profile.
Figure 6:
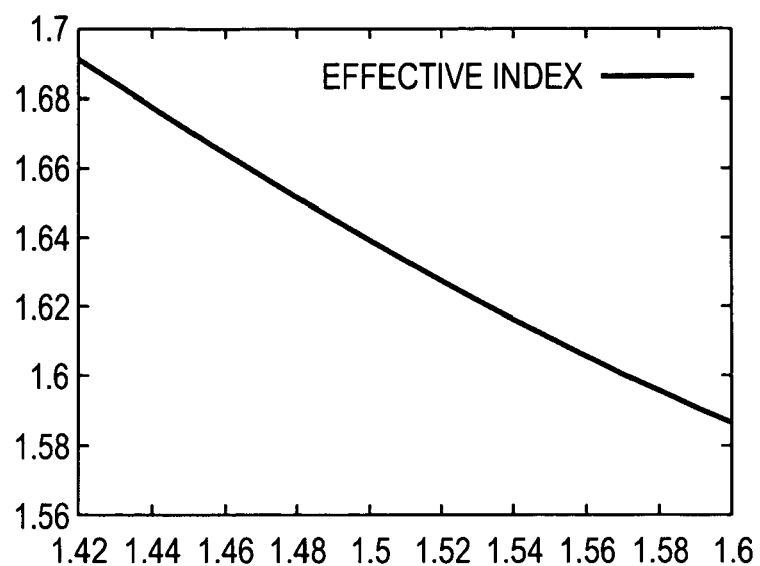
FIG. 6 is a diagram showing the effective index vs. free space wavelength in microns for the slot waveguide of FIG. 5.

One solution to these problems involves using a slot waveguide geometry. In a slot waveguide, two silicon stripes are formed by etching an SOI slab, and are separated by a small distance. In one embodiment, the separation is approximately 60 nm. The optical mode in such a structure tends to propagate mainly within the center of the waveguide. In the case of primarily horizontal polarization, the discontinuity condition at the cladding-silicon interface leads to a large concentration of the optical field in the slot or trench between the two stripes. One can predict that the electric field intensity would be approximately $10^8 \sqrt{P}$ V/m where P is the input power in watts. FIG. 5 shows the approximate geometry used for the design in this embodiment, as well as the solved mode pattern for light at approximately 1.53 µm. As seen in FIG. 5, the mode profile comprises |E| contours, plotted in increments of 10% of the maximum field value. The E field is oriented primarily parallel to the wafer surface. This mode was obtained from a full vectoral eigensolver based on a finite difference time domain (FDTD) model. Our designs use a 120 nm silicon on insulator layer and 300 nm wide silicon strips on top of a 1.4 µm thick buried oxide layer, which is in turn deposited on a silicon substrate. After the lithographic waveguide definition process, polymethylmethacrylate (PMMA) was deposited as the top cladding layer. Various widths for the central slot were fabricated to provide test devices with 50, 60 and 70 nm gaps. The mode profile shown in FIG. 5 and the dispersion diagram shown in FIG. 6 are for a 60 nm slot. FIG. 6 is a diagram showing the effective index vs. free space wavelength in microns for the slot waveguide of FIG. 5. Slots larger than 70 nm have also been fabricated and were shown to work well.

In the 1.4-1.6 µm wavelength regime, the waveguide geometry is single mode, and a well-contained optical mode is supported between the two silicon waveguide slabs. There is some loss that such an optical mode will experience even in the absence of any scattering loss or material absorption due to leakage of light into the silicon substrate. The substrate loss can be estimated semi-analytically via perturbation theory, and ranges from approximately –0.15 dB/cm at 1.49 µm to about –0.6 dB/cm at 1.55 µm for the SOI wafer geometry of the present embodiment.

Figure 7:
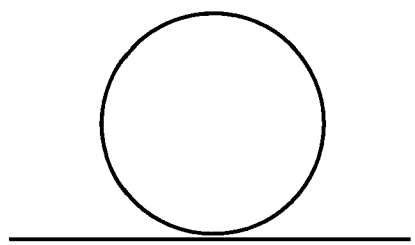
FIG. 7 is a diagram showing the device layout of an exemplary slot waveguide.
Figure 8:
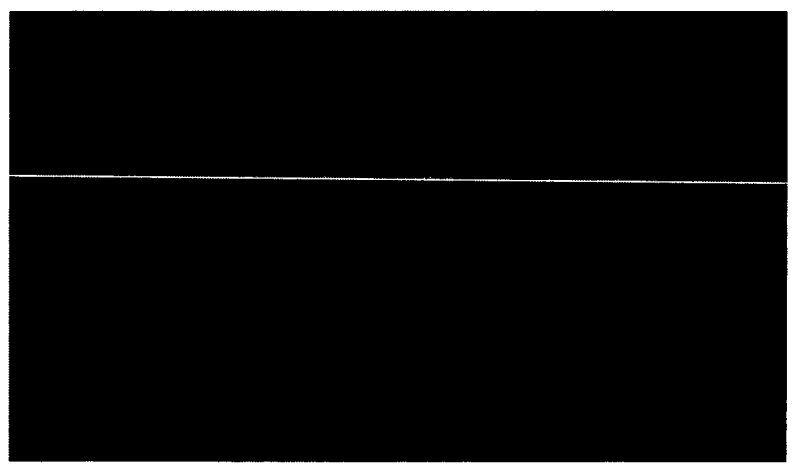
FIG. 8 is a diagram showing an SEM image of a portion of an oval slot waveguide.
Figure 8:
Figure 9:
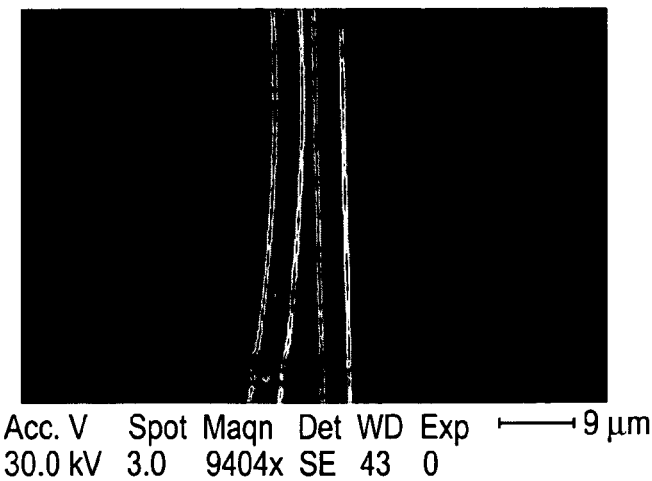
FIG. 9 is a diagram showing a more detailed SEM image showing the coupling region of an exemplary slot waveguide and an input waveguide.

Oval resonators were fabricated by patterning the slot waveguides into an oval shape. An oval resonator geometry was selected in preference to the more conventional circular shape to enable a longer coupling distance between the oval and the external coupling waveguide or input waveguide. See FIG. 7. Slots were introduced into both the oval and external coupling waveguides. FIG. 8 and FIG. 9 show scanning electron micrograph images of an exemplary resonator and the input coupler.

Predicting coupling strength and waveguide losses for such devices is not easy. Many different coupling lengths and ring to input waveguide separations were fabricated and tested. It is well known that the most distinct resonance behavior would be observed for critically coupled resonators, in which the coupling strength roughly matches the round trip loss in the ring.

An analytic expression for the quality factor of a ring resonator was presented in equation (1) hereinabove.

Also, the free spectral range can be calculated via:

$$\Delta\lambda = \frac{\left(\frac{\lambda_0}{L}\right)}{\left(\frac{1}{L} + \frac{n_0}{\lambda_0} - \left(\frac{\partial n}{\partial \lambda}\right)_0\right)} \quad (2)$$

Here, L is the round trip length in the ring, and $n_0$ and $\lambda_0$ are the index of refraction, and the wavelength at resonance, respectively. The derivative of the effective index with respect to the wavelength at the resonance peak is given by $(\delta n/\delta \lambda)_0$, and it can be shown that this term is roughly equal to $-0.6\ \mu m^{-1}$ from the 1.4-1.6 µm spectral range for the slot waveguides studied here.

Figure 10:
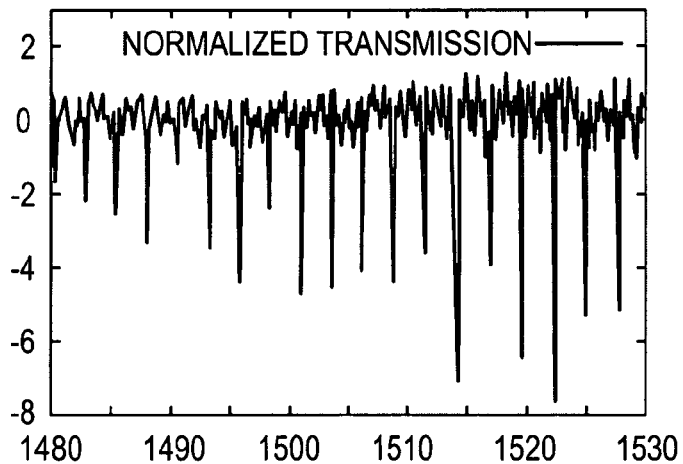
FIG. 10 is a diagram showing the measured transmission spectrum in dB vs. laser wavelength in nm past a high quality factor slot ring resonator.
Figure 11:
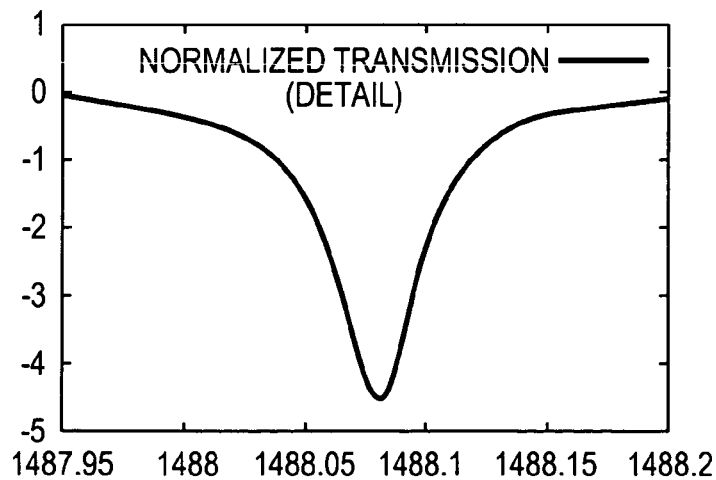
FIG. 11 is a diagram showing the detail of the peak of the transmission spectrum near 1488 nm.

We have observed a quality factor of 27,000 in a device fabricated with a slot size of 70 nm, a ring to input waveguide edge to edge separation of 650 nm, and a coupling distance of 1.6 µm. The radius of the circular part of the slotted oval was 50 µm. This resonance was observed near 1488 nm, and the resonance peak had an extinction ratio of 4.5 dB. FIG. 10 shows the measured transmission spectrum past the ring, normalized for the input coupler baseline efficiency of our test system. FIG. 11 shows the details of one peak in the vicinity of 1488 nm. Because the extinction ratio at the resonance peak was not very large in this case, it was not possible to accurately determine waveguide losses from this device. By measuring many devices with different geometries, we obtained data on resonators with higher extinction ratios that approached critical coupling. One such device was a 50 µm radius slotted ring resonator with a 60 nm waveguide gap, a ring to input waveguide spacing of 550 nm and coupling length of 1.6 µm. In this device, a Q of 23,400 was observed near 1523 nm, with an on-resonance extinction of 14.7 dB.

Since this resonance is nearly critically coupled, the waveguide loss can be estimated using equation (1) as –10 dB/cm. We can also use equation (2) to further validate our theoretical picture of the ring resonator. The observed free spectral range of this resonator was 2.74 nm, while equation (2) predicts 2.9 nm. This discrepancy is most likely due to small differences in the fabricated dimensions as compared to those for which the numerical solutions were obtained.

To further validate the waveguide loss result, several waveguide loss calibration loops were fabricated with varying lengths of the slot waveguide, ranging from 200 to 8200 um in length. A total of five center slot waveguide devices were studied for each of the 50, 60 and 70 nm slot widths. Linear regression analysis on the peak transmission of each series yielded waveguide loss figures of 11.6±3.5 dB/cm for the 50 nm center waveguide, 7.7±2.3 dB/cm for the 60 nm center waveguide, and 8.1±1.1 dB/cm for the 70 nm center waveguide. These figures are in agreement with the loss estimated from the oval resonator. Since the theoretical loss due to substrate leakage is much lower than this, it is clear that a great deal of loss is due to surface roughness and possibly material absorption. It is believed that engineering improvements will decrease this loss further. For sensing and modulation applications as well as use in nonlinear optics, the high optical field concentration that can be supported in the cladding material of the slotted waveguide geometry should be very advantageous when compared to more conventional waveguides.

Figure 12:
FIG. 12 is a diagram showing a shallow angle SEM view of a typical silicon-on-insulator ring resonator and waveguide having a sidewall roughness on the order of 10 nm.
Figure 13:
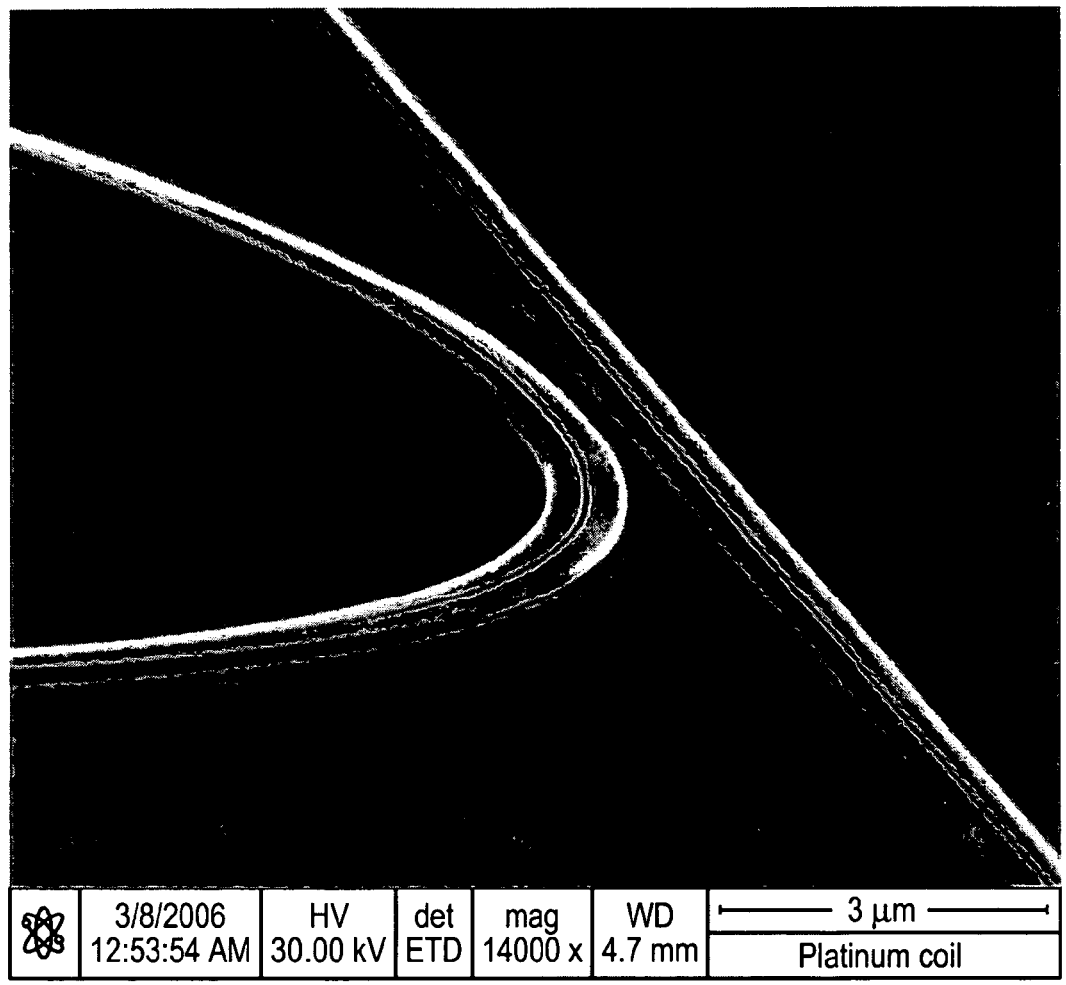
FIG. 13 is a diagram of a slot ring resonator directional coupler region, and the associated input waveguide.

FIG. 12 is a diagram showing a shallow angle SEM view of a silicon-on-insulator ring resonator and waveguide having a sidewall roughness on the order of 10 nm. In the exemplary waveguide shown in FIG. 12, the silicon-insulator bond has been decorated with a brief buffered oxide etch. FIG. 13 is a diagram of a slot ring resonator directional coupler region, and the associated input waveguide.

Figure 14:
FIG. 14 is a diagram showing a slot waveguide structure that exhibits subfield stitching errors at the edge of an input waveguide.
Figure 15:
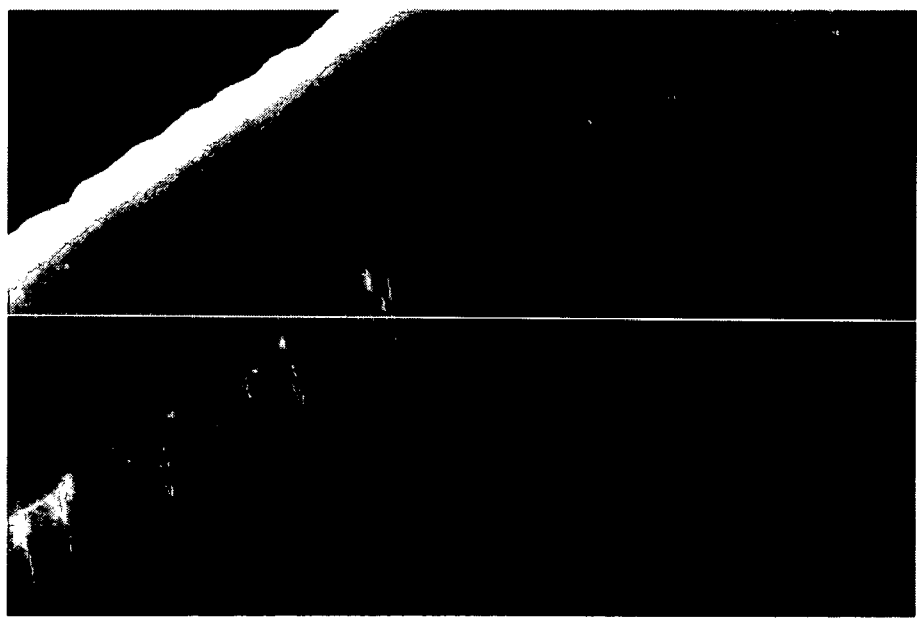
FIG. 15 is a diagram showing yet another example of a rough wall that is likely to create problems in device fabrication and operation.

By comparison, FIG. 14 is a diagram showing a slot waveguide structure that exhibits subfield stitching errors at the edge of the input waveguide in the example shown. Such errors can be devastating for waveguide loss. Because electric fields are known to concentrate at sharp corners or surface irregularities, it is expected that such sharp features occurring at undefined (or random) locations on the surface of a waveguide will have deleterious consequences for the desired electric field profiles. FIG. 15 is yet another example of a rough wall that is likely to create problems in device fabrication and operation. It is therefore preferred that the walls of waveguides according to principles of the invention be constructed so as to minimize the occurrence of sharp features.

Figure 16:
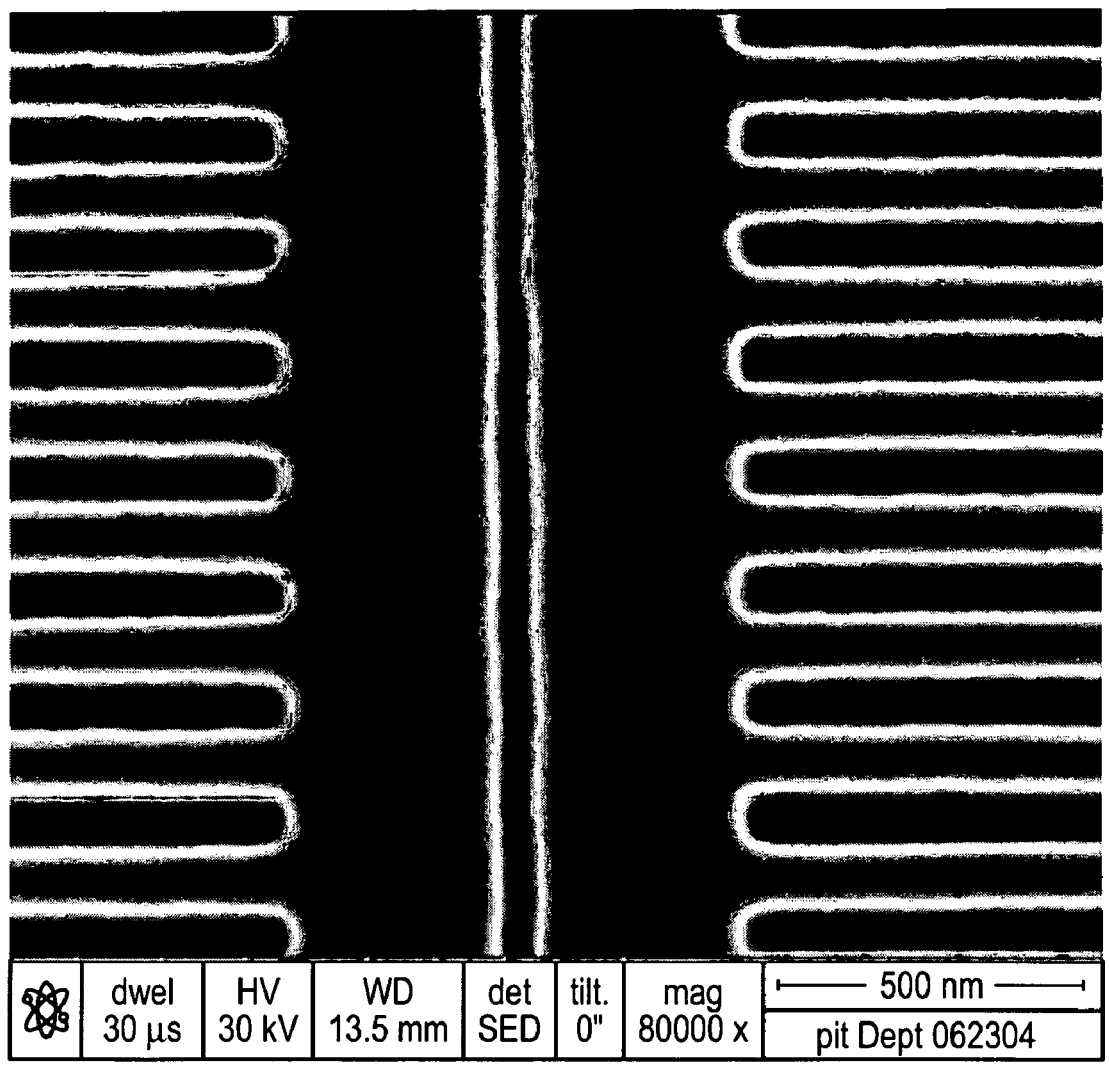
FIG. 16 is a diagram showing an exemplary high-index segmented waveguide structures, which in the embodiment shown comprises a central waveguide portion with fingers or ridges sticking out to the sides.

Other variations on the geometry of waveguides are possible. FIG. 16 is a diagram showing an exemplary high-index segmented waveguide structures, which in the embodiment shown comprises a central waveguide portion with fingers or ridges sticking out to the sides. With the light localized in the center in a Bloch mode, electrical contact can be established using the fingers or ridges that stick off the sides of the waveguide. This structure provides a way to form both electrical contacts to waveguides and structures that would provide electrical isolation with low optical loss. Through an iterative process involving a combination of optical design using a Hermetian Bloch mode eigensolver and fabrication of actual structures, it was found that (non-slotted) segmented waveguide structures could be constructed in 120 nm thick SOI. Waveguide losses as small as −16 dB per centimeter were observed, and insertion losses as small as −0.16 dB were shown from standard silicon waveguides.

Figure 17:
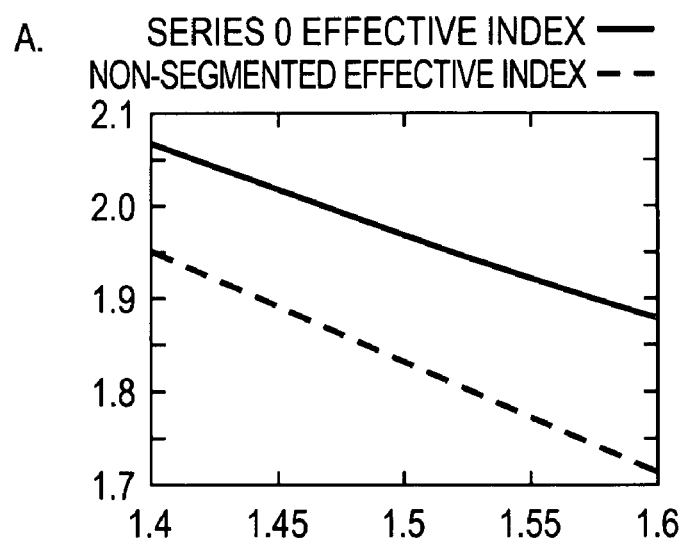
Figure 17:
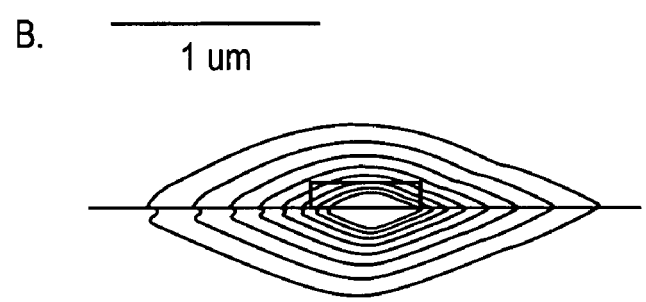
Figure 17:
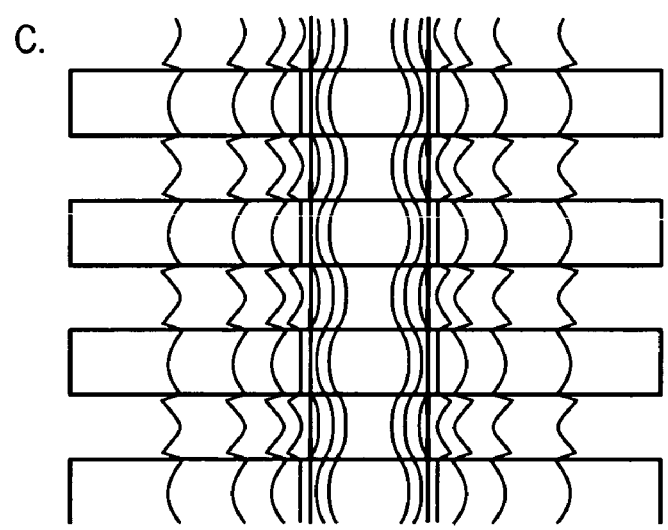

The segmented waveguide structure can also be modeled as regards its expected properties, which can then be compared to actual results. FIG. 17A is a diagram that shows a dispersion diagram of both a segmented waveguide and the normal, unsegmented waveguide, taken on a plane parallel to the substrate that on a z plane that intersects the middle of a segment. FIG. 17B is a diagram that shows modal patterns of the Bloch mode, with contours of |E| plotted, starting at 10% of the max value and with contour increments of 10%. FIG. 17C is a diagram that shows a plot of modal patterns over four periods of a segmented waveguide on a horizontal plane that intersects the silicon layer halfway through.

Figure 18:
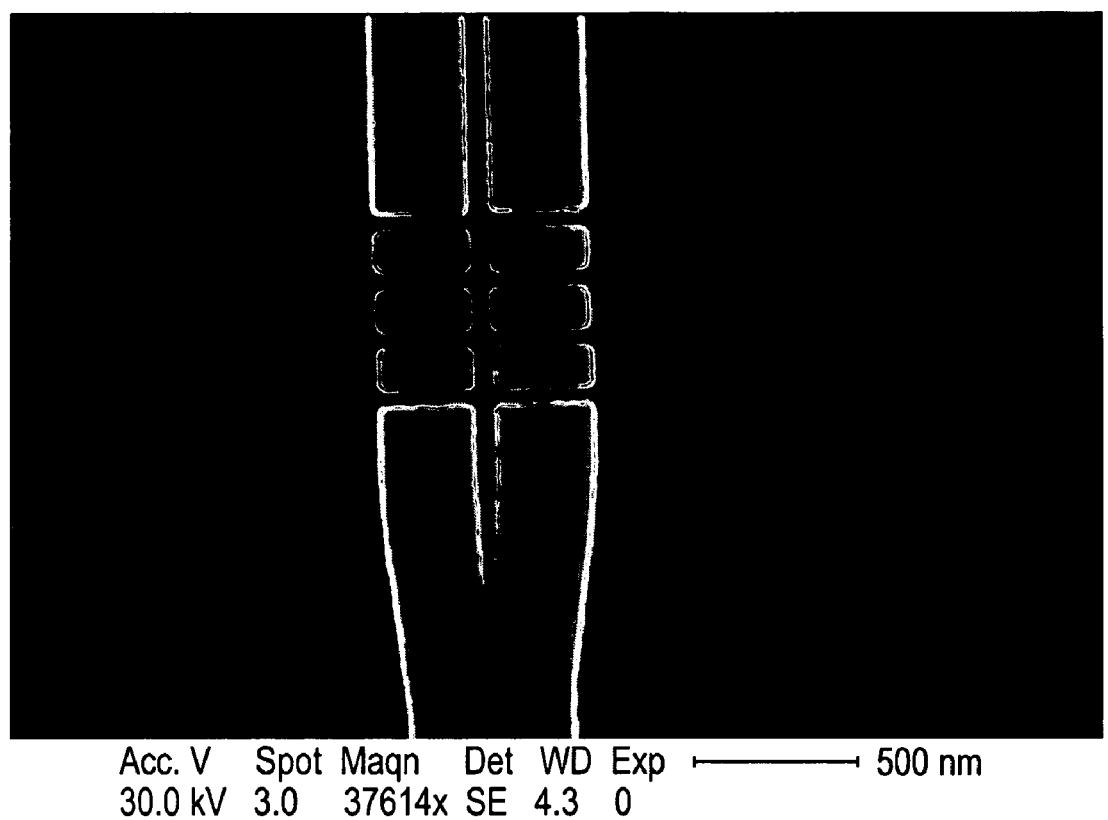
FIG. 18 is a diagram that shows an exemplary electrical isolator that was constructed and tested, and which provided both a transition from a standard to a slotted waveguide and electrical isolation between the two sides of the slot waveguide.

By utilizing the same type of design methodology as was used for the segmented waveguides, one is able to able to construct structures that provide electrical isolation without substantial optical loss. FIG. 18 is a diagram that shows an exemplary electrical isolator that was constructed and tested, and which provided both a transition from a standard to a slotted waveguide and electrical isolation between the two sides of the slot waveguide. Such structures were shown to have losses on the order of 0.5 dB.

Exemplary Results for Waveguides with Cladding Materials

EXAMPLES 1-4

Four-Wave Mixing in Silicon Waveguides with $\chi^3$ Polymer Material

Two types of integrated nano-optical silicon waveguide structures were used for this demonstration. The first type of structure was a series of ring resonator structures, which allowed an estimation of the waveguide loss of the nonlinear material. The second type of structures used were long runout devices, which comprised a simple waveguide loop with distances on the order of 0.7 cm. Characterization of loss could be done passively.

For the actual nonlinear testing, a Keopsys EDFA was used to boost two lasers to a high power level, on the order of 30 dBm (1 Watt) or more.

The materials used for the demonstrations were clad on waveguides configured as previously described herein. The chromophore identified as JSC1 is shown by its chemical structure in FIG. 27. The chromophores identified as JSC1 and YLD 124 are two substances among many chromophores that were described in a paper by Alex Jen, et al., "Exceptional electro-optic properties through molecular design and controlled self-assembly," Proceedings of SPIE—The International Society for Optical Engineering (2005), 5935 (Linear and Nonlinear Optics of Organic Materials V), 593506/1-593506/13. The paper describes at least five additional specific chromophores, and states in part that a "series of guest-host polymers furnished with high μβ chromophores have shown large electro-optic coefficients around 100~160 pm/V@1.31 μm." It is believed that the several examples given in the present description represent a few specific examples of many chromophores that can be used as materials having large nonlinear coefficients $\chi^2$ and $\chi^3$ according to principles of the systems and methods disclosed herein. Four types of claddings were applied to waveguides situated on silicon dies:

1. JSC1/APC: The chromophore JSC1 is doped into amorphous polycarbonate (APC) with the loading of 35 wt %. The solvent we used is cyclohexanone, and concentration of overall solid in this solution is 14 wt %.

2. AJL21/PMMA: The chromophore AJL21 is doped into PMMA with the loading of 40 wt %. The solvent used was 1,1,2-trichloroethane, and solution concentration was 10 wt %.

3. AJL21 monohthic films: The chromophore AJL21 is coated by itself monolithically. The solvent was 1,1,2 trichloroethane, and the concentration was 10 wt %.

4. AJC212 monolithic films: The chromophore AJC212 was coated by itself monolithically. The solvent was cyclopentanone, and concentration was 11 wt %. This film may have wetting problems, as evidenced by periphery shrinkage after baking.

Passive Results

Waveguide loss was measured for each of the four die. Intrinsic waveguide loss with a cladding having an index of 1.46 is about 7 dB/cm. A cladding with n>1.46 would lower this figure slightly. The total loss and the estimated loss due to the polymer are presented separately. This is based on subtracting 7 dB from the polymer, and then multiplying by three, because the polymer causes approximately as third as much loss as it would for the mode if it were in a bulk material, because not all of the optical energy interacts with the polymer.

Die 1: 30 dB/cm; 69 dB/cm for bulk polymer

Die 2: 5.7 dB/cm; <1 dB/cm for bulk polymer

Die 3: the loss was too high to measure devices

Die 4: 10 dB/cm; 12 dB/cm for bulk polymer

Active Results

Figure 19:
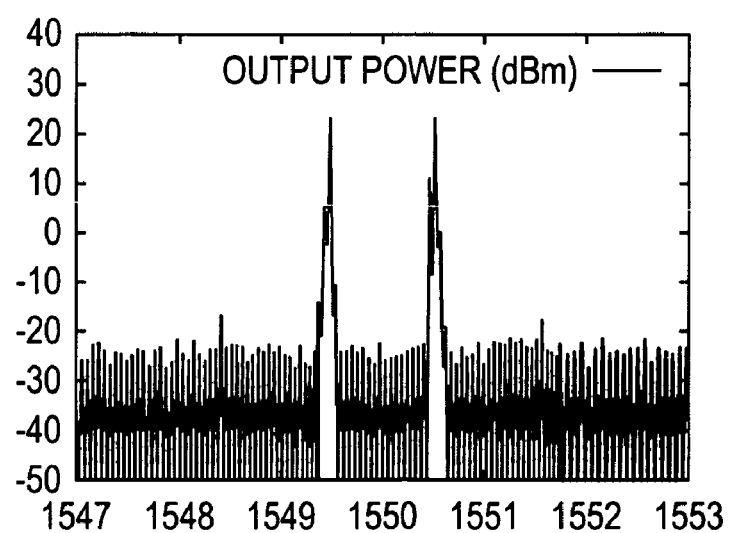
FIG. 19 is a diagram showing the results of a baseline measurement of an EDFA and optical test system in the absence of a test sample.

The intrinsic nonlinear response of our EDFA and optical test system was measured to determine a baseline for measurements on devices. FIG. 19 is a diagram showing the results of a baseline measurement of an EDFA and optical test system in the absence of a test sample. As can be seen in FIG. 19, there is a very small amount of four wave mixing that occurs. This test was performed with about 28 dBm of EDFA output. There is 40 dB of extinction from the peak to the sidebands.

A Die 1 loop device with 7000 μm of runlength produced about 29 dB of conversion efficiency (that is, sidebands were 29 dB down from peak at end of run).

Figure 20:
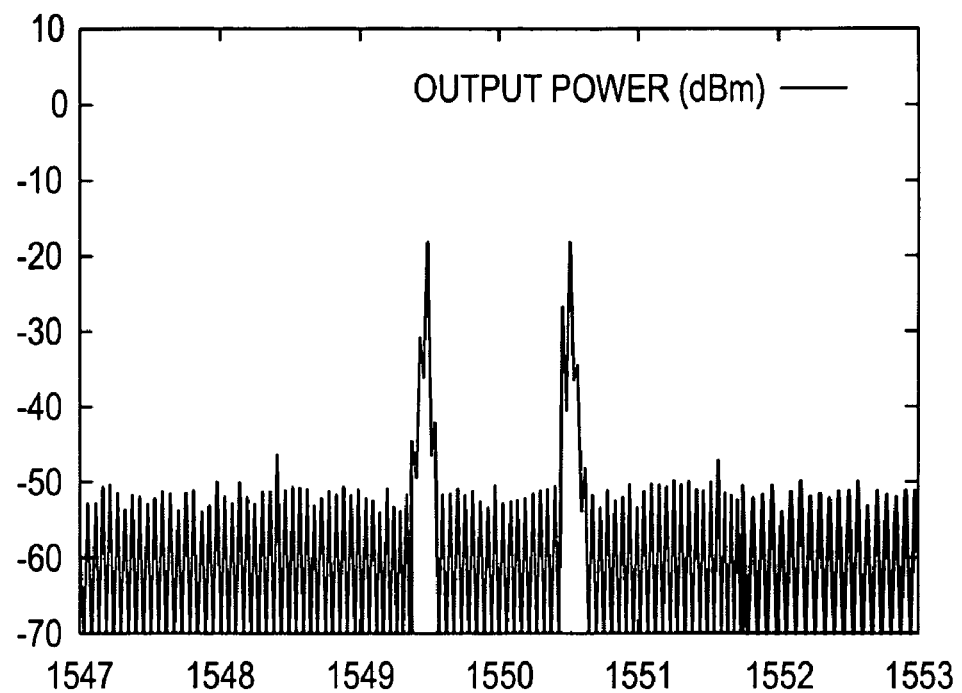
FIG. 20 is a diagram showing the results for the measurement of a first exemplary material having a large value of $\chi^3$.

FIG. 20 is a diagram showing the results for the measurement of a first exemplary material having a large value of $\chi^3$, namely Die 1 with a cladding. Even though the plot looks similar to that shown in FIG. 19, in fact there is an order of magnitude more nonlinear conversion that has occurred. The insertion loss is due to the grating couplers and the waveguide loss in the device.

Figure 21:
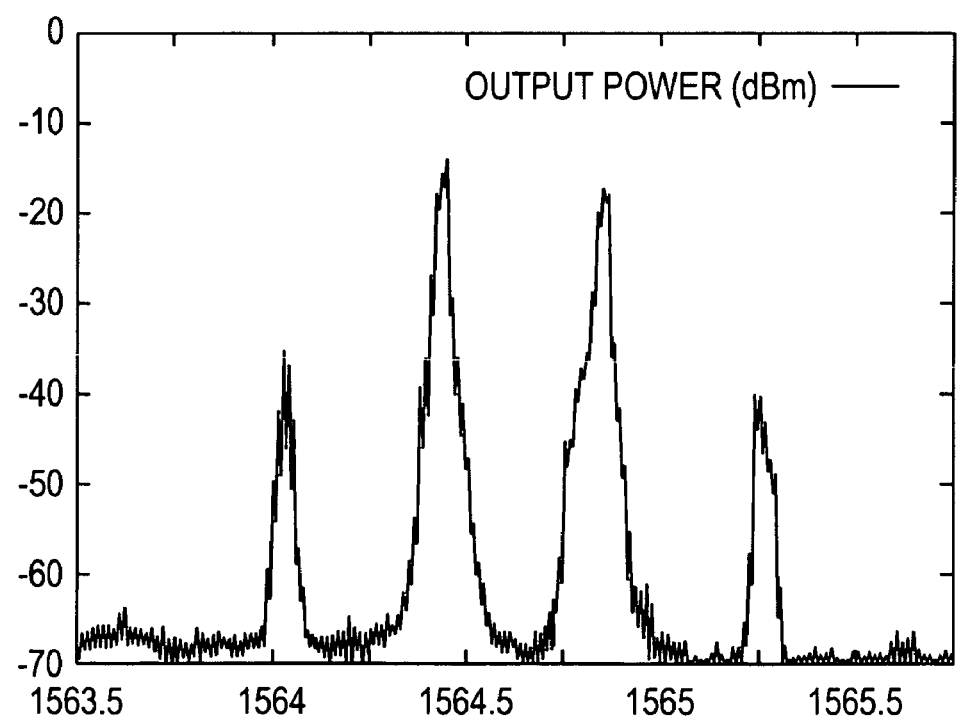
FIG. 21 is a diagram showing the results for the measurement of a second exemplary material having a large value of $\chi^3$.

FIG. 21 is a diagram showing the results for the measurement of a first exemplary material having a large value of $\chi^3$, namely Die 2 with a cladding, which showed better results than Die 1. Here there is about 20 dB of extinction from the right peak to the left sideband, and 22 dB from the larger peak on the left to the left sideband. This is the result that represents a demonstration of 1% conversion efficiency.

The noise level on some of these scans is higher than others because some were taken with faster scan settings on the optical signal analyzer.

Semi-Analytic Results

The slowly varying approximation can be used to generate the characteristic equations to predict the conversion efficiency. Let a0(z), a1(z) and a2(z) be the amplitudes of the 3 wavelengths involved in a given .four-wave mixing interaction. Let w2=2*w0-w1. Approximately, E is $10^8$ V/m for 1 Watt of power. so if we take E=a0(z)*$10^8$ V/m then a0 is power normalized to be 1 watt when |a0|=1. The characteristic equations are:

$$\frac{\partial a_0}{\partial z} = 6f \frac{i\beta_0}{neff_0^2}\exp((-2\beta_0 + \beta_1 + \beta_2)iz)a0*a1a2$$

$$\frac{\partial a_1}{\partial z} = 3f \frac{i\beta_1}{neff_1^2}\exp((2\beta_0 - \beta_1 - \beta_2)iz)a0a0a2*$$

$$\frac{\partial a_2}{\partial z} = 3f \frac{i\beta_2}{neff_2^2}\exp((2\beta_0 - \beta_1 - \beta_2)iz)a0a0a1*$$

The quantity f is taken as an unknown fraction which reduces the effect of the nonlinear material due to the fact that some of the optical energy is not in the optical region, but in the waveguide core. It is estimated that f is about 0.1, with an uncertainty of perhaps a factor of 2.

The phasor factor turns out to have an oscillation period on the order of a meter for the waveguides under consideration, and can be ignored. Based on a numerical integration, one can then estimate the $\chi^3$ coefficients for die 1 and die 2 as:

Die 1: $\chi^3$ is nearly $8\times10^{-22}$ $(m/V)^2$

Die 2: $\chi^3$ is approximately $1.5^{-22}$ $(m/V)^2$

Figure 22:
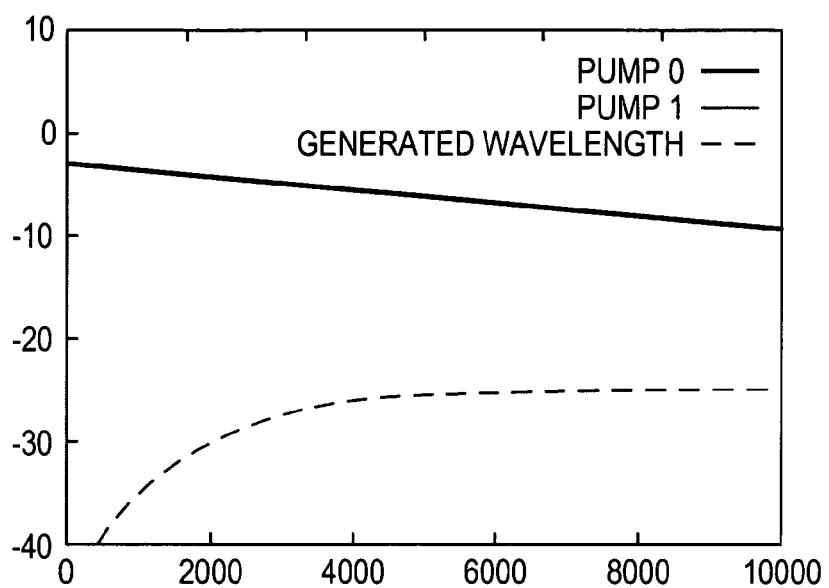
FIG. 22 is a diagram that shows a plot of the numerically computed conversion efficiency for the second exemplary material having a large value of $\chi^3$, in dB vs. 1 watt compared to length traveled in waveguide in μm.

FIG. 22 is a diagram that shows a plot of the numerically computed conversion efficiency for Die 2, in dB vs 1 watt compared to length traveled in waveguide in μm.

The devices that were tested were observed in all cases to eventually fail, either when ramping up the power levels or after extended testing. It is believed that the problem is caused by heating damage. Fortunately the damage seems not to extend to the silicon waveguides. This means that devices that fail in this way can be recovered by stripping the polymers, and then being recoated. With additional experience, solutions for the problem of this damage problem may be identified and solved.

It is unfortunate that the waveguide loss in the die 1 material is so high, because it is a material that exhibits extremely high $\chi^3$. Nevertheless, reasonable efficiencies were demonstrated with material exhibiting a lower $\chi^3$. It would be advantageous to identify a material with a value of $\chi^3$ that is larger by a factor of 10 or so. It would also be advantageous to lower the waveguide loss slightly. With these two adjustments, it would be possible to enter the "strong coupling" regime, so that one might observe 100% conversion in lengths <0.5 cm. One likely possibility would be to lower the optical loss of the Die 1 material, JSC1.

EXAMPLE 5

Optical Modulation and Detection in Slotted Silicon Waveguides

In this example, we describe a system and process that provide low power optical detection and modulation in a slotted waveguide geometry filled with nonlinear electro-optic polymers and present examples that demonstrate such methods. The nanoscale confinement of the optical mode, combined with its close proximity to electrical contacts, enables the direct conversion of optical energy to electrical energy, without external bias, via optical rectification, and also enhances electro-optic modulation. We demonstrate this process for power levels in the sub-milliwatt regime, as compared to the kilowatt regime in which optical nonlinear effects are typically observed at short length scales. The results presented show that a new class of detectors based on nonlinear optics can be fabricated and operated.

Waveguide-based integrated optics in silicon provide systems and methods for concentrating and guiding light at the nanoscale. The high index contrast between silicon and common cladding materials enables extremely compact waveguides with very high mode field concentrations, and allows the use of established CMOS fabrication techniques to define photonic integrated circuits. As we have already explained hereinabove, by using slotted waveguides, it is possible to further concentrate a large fraction of the guided mode into a gap within the center of a silicon waveguide. This geometry greatly magnifies the electric field associated with the optical mode, resulting in electric fields of at least (or in excess of) $10^6$ V/m for continuous-wave, sub-milliwatt optical signals. Moreover, since the slotted geometry comprises two silicon strips which can be electrically isolated, a convenient mechanism for electro-optic interaction is provided. Such waveguides can be fabricated with low loss. We have previously described systems that provide losses below −10 dB/cm.

In the present example, we exploit both the high intensity of the optical field and the close proximity of the electrodes for several purposes. First, we demonstrate detection of optical signals via direct conversion to electrical energy by means of nonlinear optical rectification. An exemplary device comprises a ring resonator with an electro-optic polymer based $\chi^2$ material deposited as a cladding. Inside the slot, the high optical field intensity creates a standing DC field, which creates a virtual voltage source between the two silicon electrodes, resulting in a measurable current flow, in the absence of any external electrical bias. Though optical rectification has been observed in electro-optic polymers, typically instantaneous optical powers on the order of 1 kW are needed for observable conversion efficiencies, often achieved with pulsed lasers. The exemplary embodiment provides measurable conversion with less than 1 mW of non-pulsed input, obtained from a standard, low power tunable laser operating near 1500 nm.

In one embodiment, systems and methods of the invention provide standard Pockels' effect based modulation, which is similarly enhanced by means of the very small scale of our device. The close proximity of the electrodes, and ready overlap with the optical mode, causes an external voltage to produce a far larger effective electric modulation field, and therefore refractive index shift, than would be obtained through conventional waveguide designs. In one embodiment, the modulation and refractive index shift is provided by tuning the resonance frequencies of a slot waveguide ring resonator.

Device Fabrication

Waveguide Fabrication

The devices described in this example were fabricated in electronic grade silicon-on-insulator (SOI) with a top layer thickness of 110 nm and an oxide thickness of 1.3 microns. The silicon layer is subsequently doped to approximately 1019 Phosphorous atoms/$cm^3$, yielding resistivities after dopant activation of about 0.025 ohm-cm. Electro-optic ("EO") polymers were then spin-deposited onto the waveguide structures and subsequently poled by using a high field applied across the slot in the waveguide.

Lithography was performed using a Leica EBPG 5000+ electron beam system at 100 kv. Prior to lithography, the samples were manually cleaved, cleaned in acetone and isopropanol, baked for 20 minutes at 180 C, coated with 2 percent HSQ resist from Dow Corning Corporation, spun for two minutes at 1000 rpm, and baked for an additional 20 minutes. The samples were exposed at 5 nm step size, at 3500 μC/$cm^2$. The samples were developed in AZ 300 TMAH developer for 3 minutes, and etched on an Oxford Instruments PLC Plasmalab 100 with chlorine at 80 sccm, forward power at 50 W, ICP power at 800 W, 12 mTorr pressure, and 33 seconds of etch time. The samples were then implanted with phosphorous at normal incidence, 3 OkeV energy, and 1×$10^{14}$ ions/$cm^2$ density. The sample was annealed under a vacuum at 950 C in a Jipilec Jetstar rapid thermal annealer. The samples were dipped in buffered hydrofluoric acid in order to remove the remnants of electron beam resist from the surface.

After initial optical testing, the samples were coated with YLD 124 electro-optic polymer, and in one case with dendrimer-based electro-optic material. The samples were stored under a vacuum at all times when they were not being tested, in order to reduce the chances of any degradation.

Synthesis of YLD 124 Coating Solution

Figure 23:
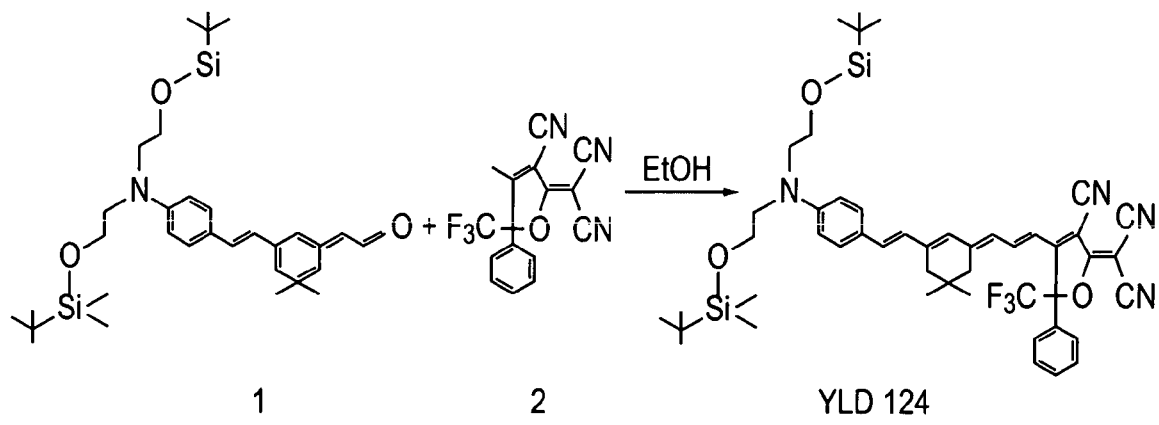
FIG. 23 is a diagram showing a chemical reaction useful for the synthesis of a chromophore referred to as YLD 124.

FIG. 23 is a diagram showing a chemical reaction useful for the synthesis of a chromophore referred to as YLD 124. The compound denoted in FIG. 23 by 1 is discussed in the paper by C. Zhang, L. R. Dalton, M. C. Oh, H. Zhang, W. H. Steier, entitled "Low V-pi electro-optic modulators from CLD-1: Chromophore design and synthesis, material processing, and characterization," which was published in Chem. Mater., volume 13, pages 3043-3050 (2001).

To a solution of 0.56 g (0.96 mmol) of 1 and 0.36 g of 2 (1.1 mmol) in 1.5 mL of THF was added 6 mL of absolute ethanol. The mixture was stirred for 6 h at room temperature. The precipitate was collected by filtration and washed by ethanol and methanol. The crude product was dissolved in minimum amount of $CH_2Cl_2$. The resultant solution was added dropwisely to 100 mL of methanol. The product (0.76 g) was collected as dark green precipitate. Yield was 90%.
$^1$H NMR (CDCl$_3$): 8.05 (t, J=13.6 Hz, IH), 7.45-7.58 (m, 5H), 7.38 (d, J=8.9 Hz, 2H) 6.93 (d, J=15.9 Hz, IH) 6.79 (d, J=15.9 Hz, 1H), 6.70 (d, J=8.9 Hz, 2H), 6.40-6.25 (m, 3H), 3.80 (t, J=5.8 Hz, 4H), 3.59 (t, J=5.8 Hz, 4H), 2.42 (s, 2H), 2.40 (s, 2H), 1.04 (s, 3H), 0.98 (s, 311), 0.90 (s, 18H), 0.04 (5, 12H). MS (ESP): 879.48 (M+H). UV-Vis (THF): 765 nm. m.p. 173° C.

One part of YLD 124 was mixed with three parts of APC (Poly[Bisphenol A carbonate-co-4,4'-(3,3,5-trimethylcyclo-hexylidene)diphenyl carbonate]). The mixture was dissolved in cyclopentanone. The total solid content (YLD 124 and APC) is about 12%. The resultant solution was filtered through a 0.2 pm filter before being used on the device to provide a cladding layer comprising the chromophore YLD 124.

Measurement Results

Optical Rectification Based Detection

Figure 24:
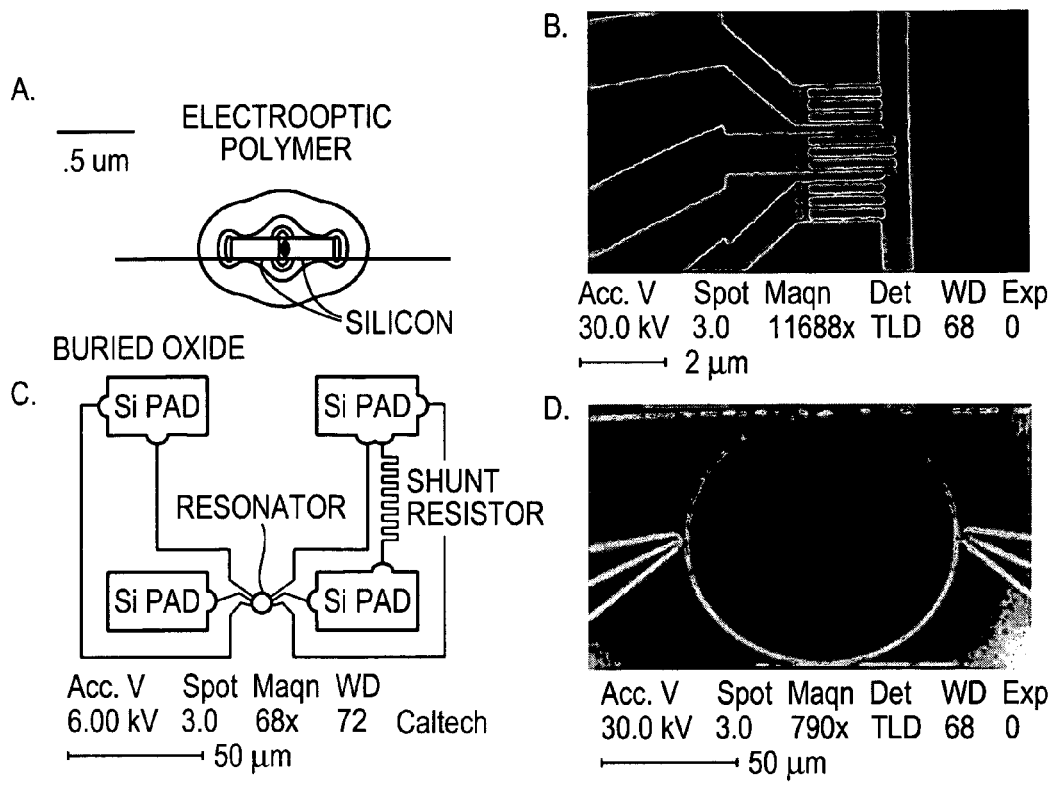
FIG. 24 is a four panel diagram that shows details of one embodiment of an optical modulator device, including the geometry of the photodetectors and filters, and including a cross section of the slotted waveguide.

FIG. 24 is a four panel diagram that shows details of one embodiment of an optical modulator device, including the geometry of the photodetectors and filters, and including a cross section of the slotted waveguide. Panel A of FIG. 24 shows a cross section of the device geometry with optical mode superimposed on a waveguide. In FIG. 24(A), the optical mode was solved using a finite-difference based Hermetian Eigensolver, such as that described by A. Taflove, *Computational Electrodynamics*, (Artech House, Boston. MA, 1995), and has an effective index of approximately 1.85 at 1500 nm. Most of the electric field is parallel to the plane of the chip, and it is possible to contact both sides of the slot in a slotted ring resonator, as shown in FIG. 24(B). Panel B of FIG. 24 shows a SEM image of the resonator electrical contacts. Electrically isolated contacts between the silicon rails defining the slotted waveguide introduce only about 0.1 dB of optical loss. Panel C of FIG. 24 shows the logical layout of device, superimposed on a SEM image of a device. FIG. 24(C) details the layout of a complete slotted ring resonator, with two contact pads connected to the outer half of the ring, and two pads electrically connected to the inner half of the ring. A shunt resistor provides a means of confirming electrical contact, and typical pad-to-pad and pad-to-ring resistances range from 1 MΩ to 5 MΩ. FIG. 24(D) displays a typical electrically contacted slotted ring described in this study. Panel D of FIG. 24 is an image of the ring and the electrical contact structures.

Measurements were performed with single-mode polarization maintaining input and output fibers, grating coupled to slotted waveguides with an insertion loss of approximately 8 dB. Optical signal was provided from an Agilent 81680a tunable laser and in some cases an erbium doped fiber amplifier ("EDFA") from Keopsys Corporation. A continuous optical signal inserted into a poled polymer ring results in a measurable current established between the two pads, which are electrically connected through a pico-Ammeter. In the most sensitive device, a DC current of ~1.3 nA was observed, indicating an electrical output power of ~$10^{-9}$ of the optical input power (5×$10^{-12}$ W of output for approximately 0.5 mW coupled into the chip). Control devices, in which PMMA or un-poled EO material was substituted, show no photocurrent.

The fact that there is no external bias (or indeed any energy source) other than the optical signal applied to the system of this embodiment demonstrates conclusively that power is being converted from the optical signal. To establish that the conversion mechanism is actually optical rectification, we performed a number of additional measurements. A steady bias was applied to the chip for several minutes, as shown in Table IA. A substantial change in the photoresponse of the device was observed. This change depends on the polarity of the bias voltage, consistent with the expected influence of repoling of the device in-place at room temperature. Specifically, if the external bias was applied opposing the original poling direction, conversion efficiency generally decreased, while an external bias in the direction of the original poling field increased conversion efficiency.

TABLE I

Polling Results

Part A:

| Action | New Steady State Current (6 dBm input) |
|---|---|
| Initial State | −5.7 pA |
| +10 V for 2 minutes | 0 pA |
| −10 V for 2 minutes | −7.1 pA |
| +10 V for 2 minutes | −4.4 pA |
| +10 V for 4 minutes | −6.1 pA |
| −10 V for 4 minutes | −4.5 pA |
| −10 V for 2 minutes | −14.8 pA |

Part B:

| Device | Action | Current Polarity of Optical Rectification |
|---|---|---|
| 1 | Positive Poling | Positive |
| 1 | Thermal Cycling to poling temperature with no voltage | Rapid fluctuation, did not settle |
| 1 | Negative Poling | Negative |
| 2 | Negative Poling | Negative |
| 2 | Thermal Cycling to Poling temperature with no voltage | None observable |
| 2 | Positive Poling | Negative |
| 3 | Negative Poling | Negative |
| 4 | Positive Poling | Positive |
| 5 | Negative Poling | Negative |

To further understand the photo-conversion mechanism, 5 EO detection devices were poled with both positive and negative polarities, thus reversing the direction of the relative $\chi^2$ tensors. For these materials, the direction of $\chi^2$ is known to align with the polling E field direction, and we have verified this through Pockels' effect measurements. In all but one case, we observe that the polarity of the generated potential is the same as that used in poling, and the +V terminal during poling acts as the −V terminal in spontaneous current generation, as shown in Table 1B. Furthermore, the polarity of the current is consistent with a virtual voltage source induced through optical rectification. It was observed that these devices decay significantly over the course of testing, and that in one case the polarity of the output current was even observed to spontaneously switch after extensive testing. However, the initial behavior of the devices after polling seems largely correlated to the $\chi^2$ direction.

Part A of Table I shows the dependence of the steady state observed current after room temperature biasing with various voltage polarities for one device. The device was originally polled with a ~12 V bias, though at 110 C. With one exception, applying a voltage in the direction of the original polling voltage enhances current conversion efficiencies, while applying a voltage against the direction of the polling voltage reduces the current conversion efficiencies. It should be noted that the power coupled on-chip in these measurements was less than 1 mW due to coupler loss.

Part B of Table I shows the behavior of several different devices immediately after thermal polling or cycling without voltage. Measurements were taken sequentially from top to bottom for a given device. The only anomaly is the third measurement on device 2; this was after significant testing, and the current observed was substantially less than was observed in previous tests on the same device. We suspect that the polymer was degraded by repeated testing in this case.

A number of measurements were performed to attempt to produce negative results, and to exclude the possibility of a mistaken measurement of photocurrent. The power input to the chip was turned on and off by simply moving the fiber array away from the chip mechanically, without changing the circuit electrically, and the expected change in the electrical output signal of our detector was observed. A chip was coated in polymethylmethacrylate and tested, resulting in no observed photocurrents. Also, when some of the devices shown in Table I were tested before any polling had been performed; no current was observed.

We used a lock-in amplifier to establish a quantitative relationship between the laser power in the EQ material and the photo-current, and achieved a noise floor of about 0.2 pA. This resulted in a reasonable dynamic range for the 10-200 pA photocurrent readings. FIG. 25(A) and FIG. 25(B) show optical transmission curves for typical devices. FIG. 25(C) shows several traces of output current versus input laser power, and a fairly linear relationship is observed. The relationship I=cP, where I is the output current, P is the input laser power, and c is a proportionality constant ranging from 88+/−10 pA/mW at a 1 kHz lock-in measurement and when the wavelength is on resonance, changing to a lower value of 58+/−8 pA/mW off resonance for the best device. It is important to note that current was easily observed with only a pico-ammeter, or by simply connecting an oscilloscope to the output terminal and observing the voltage deflection.

Panel A of FIG. 25 shows the transmission spectrum of detector device I. Panel B of FIG. 25 shows the transmission spectrum of detector device 2. Panel C of FIG. 25 shows several curves of current vs. power for three measurement series. Series 1 is of the first device with the wavelength at 1549.26 nm, on a resonance peak. Series 2 is the first device with the wavelength at 1550.5 nm off resonance. Series 3 is for device 2, with the wavelength at 1551.3 nm, on resonance. Finally, panel D of FIG. 25 shows the output current as a function of wavelength, overlaid with the transmission spectrum. The transmission spectrum has been arbitrarily rescaled to show the contrast.

As another demonstration of the dependence of the output current on the amount of light coupled into the resonator, we also tuned the laser frequency and measured the output current. As can be seen in FIG. 25(D), the amount of output current increases as the laser is tuned onto a resonance peak. This again indicates that the overlap between the EO polymer in the resonator and the optical mode is responsible for the photo-current. We have overlaid a photocurrent vs. wavelength response scan to show the resonance peaks for comparison. It should not be surprising that a small photo-current is still measured when the laser is off resonance, since the amount of radiation in a low-Q ring resonator is non-negligible oven off resonance. We have successfully observed this detector function at speeds up to 1 MHz, without significant observable rolloff. This is again consistent with optical rectification. Unfortunately, our devices could not be measured at higher speeds, due to substantial output impedance.

The conversion efficiency from our first measurements is thought to be several orders of magnitude below the ultimate limit, and can be explained by the high insertion losses in our system. In the present embodiment, 75% of the input power in the fiber is not coupled onto the chip. Our low-Q resonators only provide a limited path length within which light can interact with the electro-optic material. Furthermore, by design a great deal of the light in the resonator will be dumped to an output port, and not absorbed. It is expected that with further design and higher Q resonators, the efficiency of these devices can be greatly increased. It is, however, important to note that nothing about this effect depends on the presence of rings. The rings provide a convenient and compact device for observing these effects, but one could just as easily observe optical rectification by using other geometries, such as a long linear, polymer coated, split waveguide, with each side connected to an electrical pad.

Pockels' Effect Modulation

At DC, the Pockels effect was measured by applying varying voltages to the device and observing the device transmission as a function of wavelength. For devices having operative modulation, the resonance peaks were shifted, often to a noticeable degree. To counter the systemic drift due to temperature fluctuations, a series of random voltages were applied to a device under test and the wavelength responses noted. The intersection of a resonance peak and a certain extinction, chosen to be at least 10 dB above the noise floor, was followed across multiple scans. A 2d linear regression was performed, resulting in two coefficients, one relating drift to time, and one relating drift to voltage.

At AC, a square wave input voltage was applied across the device. The input wavelength was tuned until the output signal had the maximum extinction. It was determined what power levels were implied by the output voltage, and then the observed power levels were fit to a wavelength sweep of the resonance peak. This readily allowed the tuning range to be calculated. We successfully measured AC tuning up to the low MHz regime. The limitation at these frequencies was noise in our electrical driving signal path, and not, as far as we can tell, any rolloff in the modulation process itself.

FIG. 26 is a diagram showing the use of the structures embodying the invention as resonantly enhanced electro-optic modulators, and a result at approximately 6 MHz operating frequency, representing a bit pattern generated by Pockels' Effect modulation of 5 dB. The vertical axis represents input voltage and output power, both in arbitrary units. The horizontal axis represents time in units of microseconds. Voltage swing on the input signal is 20 volts. These measurements clearly demonstrate that low-voltage electro-optic tuning and modulation can be achieved in the same geometries as have been described for photodetection. It should be emphasized that these devices are not optimized as modulators. By increasing the Q of the resonators to exceed 20,000, which has been described hereinabove, it will be possible to achieve much larger extinction values per applied voltage.

By utilizing new dendrimer-based electro-optic materials, we have achieved 0.042±008 nm/V, or 5.2±1 GHZ/V for these rings. This implies an $r_{33}$ of 79±15 pm/V. This result is better than those obtained for rings of 750 micron radius, which we believe to be the best tuning figure published to date. By contrast, our rings have radii of 40 microns. We credit our improvement over the previous results mainly to the field enhancement properties of our waveguide geometry.

Theoretical Discussion

Optical Rectification Theory

The general governing equation of nonlinear optics is known to be:

$$D_i = \epsilon_0(\epsilon_r E_i + \chi_{ijk}^2 E_j E_k + \ldots)$$

Our EO polymers are designed to exhibit a relatively strong $\chi^2$ moment, ranging from 10-100 pm/V. In most $\chi^2$ EO polymer systems, the Pockel's effect is used to allow the electric field (due to a DC or RF modulation signal) to modify the index of refraction. In such systems the modulating electric field is typically far in excess of the electric field from the optical signal and the term that produces the material birefringence is the only term of importance in the above equation.

Our waveguides, however, have a very large electric field as most of the radiation is confined to a 0.01 square micron cross section. It can be shown that the electric field is approximately uniform in the transverse direction, with a magnitude of $$10^8 \sqrt{P} \frac{V}{m}$$

where P is the optical power in Watts. At large optical fields, the non-Pockels terms involved in the governing nonlinear equation cannot be neglected. For coherent input power, at a given location in the waveguide, the optical field is:

$$E_{optical}(t) = A\cos(wt + \theta)$$

The term $$E_{optical}^2 = \frac{A^2}{2}\cos(2(wt+\theta)) + \frac{A^2}{2}$$

will therefore contain not only frequency doubled components, but also a "DC" component. This phenomenon is known as optical rectification. We believe that this DC component provides a likely explanation for the photocurrent that we observe. Because we have positioned electrodes (the two sides of the slot waveguide) at precisely the bounds of the induced field, the effect of optical rectification takes a small slice of the optical power and converts it into a virtual voltage source between the two arms. This in turn induces a current that we can measure and is linearly proportional to the input power $E_{optical}^2$.

Now let us consider the solution to Maxwell's equation in more detail. Our system can be approximated for this discussion as having two dimensions, with both the optical and DC electric field in the x direction and propagation in the z direction, for instance. Let us imagine that the $\chi^2$ is nonzero and small for a tiny region from 0 to w in the x dimension. $\chi^2$ is sufficiently small that the electric field due to the optical mode is still uniform. Let us imagine the system has no charge anywhere. The optical electric field can be written as $E=Ae^{(ikz-i\omega t)}+c.c.$ where c.c. indicates a complex conjugate. Let us further assume that the rectified DC field is of real amplitude C and uniformly directed in the x dimension on (0, w), and 0 elsewhere.

Other than the divergence condition, Maxwell's equations are still satisfied by this system. But at the edge of an interface on the interior, the DC frequency component of $D_x$, the displacement electric field, is discontinuous. At x0, we have:

$$D_x^- = 0$$

$$D_x^+ = \epsilon_0(\epsilon_r C + \chi^2 C^2 + 2\chi^2 |A|^2)$$

We neglect $\chi^2 C^2$ because we expect the amplitude of the rectified field to be far smaller than that of the optical field.

Clearly, the boundary condition of zero divergence can only be satisfied if $D_x^+$ is 0. Then, $$C = -\frac{2\chi^2}{\varepsilon_r}|A|^2$$

Thus the direction of the rectified field is reversed compared to the direction of $\chi^2$. Note that there is no particular direction associated with the optical field as it is continually oscillating. As we have seen, this rectified DC field would then, if acting as a virtual voltage source, create an effective positive terminal on the positive polling terminal.

Analysis of Data for Optical Rectification

To derive the magnitude of the expected photocurrent, we assume that the $\chi^2$ magnitude relating to the Pockels' effect is similar to that for optical rectification. A measurement of $\chi^2$ can then be obtained from the direct observation of the electro-optic coefficient by the standard measurements described earlier. The typical measured tuning value of 2 GHz/V yields approximately 50 pm/V.

In the best case, devices with 6 dBm of input power returned approximately 1.4 nA of current. With Qs ranging from 3 k to 5 k, and assuming approximately 7 dB of insertion loss in the input grating coupler on one of our chips, in the best case as much as 0 dBm might be circulating in a resonator on resonance. This implies a peak electric field due to the optical signal of approximately $3.1 \times 10^6$ V/m. The induced static nonlinear polarization field is then nearly 1000 V/m, which amounts to a voltage drop of $14 \times 10^{-5}$ V across a 140 nm gap. If this voltage is assumed to be perfectly maintained, and the load resistance is assumed to be 5 MΩ, then 28 pA would be generated, about a factor of 100 less than is observed in the largest measurement made, but within a factor of 20 of the typical measurement of 352 pA for 6 dBm of input. Significantly, because the generated current is quadratic in E, it is clear that the current will be linearly proportional to the input intensity. This is in accordance with our observations. The best results for optical rectification were obtained with YLD 124/APC polymer, whereas our best Pockels' Effect results were obtained with the dendrimer materials.

Significantly, the sign of the output current matches that which would be predicted by nonlinear optical rectification, as discussed above. Specifically, since positive current emanates from the positive terminal, the rectified E field has a sign reversed from the $\chi^2$ and the polling E field. It is well established that the $\chi^2$ direction tends to align with the direction of the polling E field. Because of this, the rectified field acting as a voltage source will produce an effective positive terminal at the terminal that had the positive polling voltage.

We do not yet fully understand the current generation mechanism. In particular, it is not clear what provides the mechanism for charge transport across the gap. The APC material in which the nonlinear polymer is hosted is insulating, and though it does exhibit the photoconductivity effect due to visible light, it is unclear whether it can for near-infrared radiation. Photoconductivity due to second harmonic generation may play a role in this effect. It is certainly the case, however, that current flows through this gap; that is the only region in the entire system where an electromotive force exists. Also, photoconductivity alone is not adequate to explain the reversal of the current coming from the detector devices when the poling direction is reversed, nor the conversion of the optical input into directed current in general. The only mechanism to our knowledge that adequately explains this data is optical rectification.

If we assume that it will be possible to achieve a 10-fold improvement in the Q's of the resonators, while still getting more than 10 dB of extinction, then the intensity circulating in such a ring would be about 13 dB up from the intensity of the input wave. By comparison, with a Q of about 1000 and high extinction, the peak circulating intensity is about the same as the intensity in the input waveguide. Therefore, it is reasonable to expect that it will be possible to get at least 10 dB of improvement in the circulating intensity, and thus in the conversion efficiency, by fabricating higher Q rings.

By combining the nano-scale slotted waveguide geometry with electro-optical polymers having high nonlinear constants, we have obtained massive enhancement of the optical field. That has in turn enabled us to exploit nonlinear optical processes that are typically only available in the kW regime in the sub-mW regime. This difference is so considerable that we believe it represents a change in kind for the function of nonlinear optical devices. In addition, it is believed that this hybrid material system provides systems and methods for creating compact devices that exploit other nonlinear phenomena on-chip.

Optical rectification based detectors can have many advantages over currently available technology. In particular, such detectors are expected to function at a higher intrinsic rate than the typical photodiode in use, as the optical rectification process occurs at the optical frequency itself, on the order of 100 THz in WDM systems. The absence of an external bias, and the generation of a voltage rather than a change in current flow, both provide certain advantages in electronic operation. We also believe that a device based on nonlinear optical rectification will not suffer from the limitation of a dark current. This in turn can provide WDM systems that will function with lower optical power, providing numerous benefits. Similarly, our demonstration of enhanced modulation using these waveguide geometries provides useful components for future communications systems.

We conclude by stressing advantageous economic aspects of our invention in various embodiments. Because our devices can be fabricated in planar electronics grade silicon-on-insulator, using processes compatible with advanced CMOS processing, it is expected that devices embodying these principles will be less expensive to fabricate.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An apparatus for generating Bremsstrahlung radiation, comprising:
    a substrate having an insulating surface;
    a high index contrast waveguide having at least two waveguide elements adjacent said insulating surface, said at least two waveguide elements having a region defined therebetween, said at least two waveguide elements each having at least one electrical contact in electrical communication therewith; and
    a source of electrical potential in communication with each of said contacts, said source of electrical potential configured to apply an electrical potential difference between said at least two waveguide elements;

whereby said apparatus, when activated, emits Bremsstrahlung radiation from said region between said at least two waveguide elements in response to an application of electrical potential between said at least two waveguide elements.

2. The apparatus for generating Bremsstrahlung radiation of claim 1, wherein said region between said at least two waveguide elements comprises a region devoid of matter to provide a vacuum condition therein.

3. The apparatus for generating Bremsstrahlung radiation of claim 1, wherein said region between said at least two waveguide elements is filled with an insulating material.

4. The apparatus for generating Bremsstrahlung radiation of claim 3, wherein said insulating material is a nanostructured material.

5. The apparatus for generating Bremsstrahlung radiation of claim 1, wherein said Bremsstrahlung radiation is light.

6. The apparatus for generating Bremsstrahlung radiation of claim 5, wherein said light is coupled to an optical mode of said at least two waveguide elements.

7. The apparatus for generating Bremsstrahlung radiation of claim 6, further comprising an optical source.

8. The apparatus for generating Bremsstrahlung radiation of claim 6, further comprising an optical amplifier.

9. The apparatus for generating Bremsstrahlung radiation of claim 6, further comprising optical feedback.

10. The apparatus for generating Bremsstrahlung radiation of claim 9, wherein said apparatus is configured to emit laser radiation.

11. The apparatus for generating Bremsstrahlung radiation of claim 1, wherein said apparatus is coupled to means for providing an optical nonlinearity.

12. A method of generating Bremsstrahlung radiation, comprising the steps of:
providing an apparatus comprising:
a substrate having an insulating surface; and
a high index contrast waveguide having at least two waveguide elements adjacent said insulating surface, said at least two waveguide elements having a region defined therebetween, said at least two waveguide elements each having at least one electrical contact for receiving an electrical signal in electrical communication therewith; and
applying an electrical potential difference between said at least two waveguide elements via said respective electrical contacts;
whereby said apparatus is caused to emit Bremsstrahlung radiation from said region between said at least two waveguide elements in response to said application of electrical potential between said at least two waveguide elements.

13. The method for generating Bremsstralung radiation of claim 12, wherein said region between said at least two waveguide elements comprises a region devoid of matter to provide a vacuum condition therein.

14. The method for generating Bremsstralung radiation of claim 12, wherein said region between said at least two waveguide elements is filled with an insulating material.

15. The method for generating Bremsstrahlung radiation of claim 14, wherein said insulating material is a nanostructured material.

16. The method for generating Bremsstrahlung radiation of claim 12, wherein said Bremsstrahlung radiation is light.

17. The method for generating Bremsstrahlung radiation of claim 16, wherein said light is coupled to an optical mode of said at least two waveguide elements.

18. The method for generating Bremsstrahlung radiation of claim 17, wherein said provided apparatus further comprises an optical source.

19. The method for generating Bremsstrahlung radiation of claim 17, wherein said provided apparatus further comprises an optical amplifier.

20. The method for generating Bremsstrahlung radiation of claim 17, wherein said provided apparatus further comprises optical feedback.

21. The method for generating Bremsstrahlung radiation of claim 20, wherein said Bremsstrahlung radiation is laser radiation.

* * * * *